US 8,401,805 B2

(12) United States Patent
Takeda et al.

(10) Patent No.: US 8,401,805 B2
(45) Date of Patent: Mar. 19, 2013

(54) ULTRASONIC MULTIPHASE FLOWMETER, ULTRASONIC MULTIPHASE FLOW RATE MEASUREMENT PROGRAM, AND MULTIPHASE FLOW RATE MEASUREMENT METHOD USING ULTRASONIC WAVE

(75) Inventors: Yasushi Takeda, Sapporo (JP); Yuichi Murai, Sapporo (JP); Yuji Tasaka, Sapporo (JP)

(73) Assignee: National University Corporation Hokkaido University, Hokkaido (JP)

( * ) Notice: Subject to any disclaimer, the term of this patent is extended or adjusted under 35 U.S.C. 154(b) by 415 days.

(21) Appl. No.: 12/734,648

(22) PCT Filed: Nov. 12, 2008

(86) PCT No.: PCT/JP2008/070574
§ 371 (c)(1),
(2), (4) Date: May 13, 2010

(87) PCT Pub. No.: WO2009/063896
PCT Pub. Date: May 22, 2009

(65) Prior Publication Data
US 2010/0268486 A1  Oct. 21, 2010

(30) Foreign Application Priority Data
Nov. 15, 2007  (JP) .................................. 2007-297358

(51) Int. Cl.
*G01F 1/00* (2006.01)
*G01F 1/50* (2006.01)
(52) U.S. Cl. .......... 702/48; 702/100; 702/121; 702/122
(58) Field of Classification Search .............. 702/45–50, 702/100, 182–190
See application file for complete search history.

(56) References Cited

U.S. PATENT DOCUMENTS
2003/0114756 A1 * 6/2003 Li .................................. 600/437

FOREIGN PATENT DOCUMENTS

| EP | 1 568 972 A | 8/2005 |
| EP | 1568972 | * 8/2005 |
| GB | 2 363 455 A | 12/2001 |
| GB | 2363455 | * 12/2001 |
| JP | S58-032121 | 2/1983 |
| JP | H02-107924 | 4/1990 |
| JP | 2000-097742 | 4/2000 |
| JP | 2001-166054 | 6/2001 |
| JP | 2005-208068 | 8/2005 |

OTHER PUBLICATIONS

Murai Y et al., "Turbulent Bubbly channel flow investigated by Ultrasonic Velocity Profiler", Journal of Fluid Science and Technology, The Japan Society of Mechanical Engineers, JP vol. 1, No. 1, Jun. 7, 2006, pp. 12-23, XP 008135723.*

Yuichi Murai et al., "Turbulent Bubbly Channel Flow Investigated by Ultrasound Velocity Profiler", Journal of Fluid Science and Tech, Jun. 7, 2006, pp. 12-23, vol. 1, No. 1.

(Continued)

*Primary Examiner* — Phuong Huynh
(74) *Attorney, Agent, or Firm* — DLA Piper LLP (US)

(57) ABSTRACT

An ultrasonic multiphase flowmeter, a flow rate measurement program and a multiphase flow rate measurement method using an ultrasonic wave that can measure the flow rate of a multiphase flow by detecting the position of an interface between phases by an operation processing of at least one of data on reflected ultrasonic wave and data on a flow velocity distribution are provided. The ultrasonic multiphase flowmeter functions to transmit/receive ultrasonic waves, calculate flow velocity distributions, determine interface positions, and calculate flow rates.

12 Claims, 16 Drawing Sheets

OTHER PUBLICATIONS

S. Roberto Gonzales et al., "Ultrasound-based gas-liquid interface detection in gas-liquid . . . ", Advances in Chemical Engineering, 2009, pp. 1-27, vol. 37, Elsevier Inc.

"Turbulent Bubbly . . ." written by Yuichi Murai et al. In Journal of Fluid Science and Technology by the Japan Society of Mechanical Engineers, vol. 1, No. 1, Jun. 7, 2006, p. 12-23.

* cited by examiner

Fig. 6

|  | 1 | 2 | 3 |
|---|---|---|---|
| 1 | -1 | -1 | -1 |
| 2 | 1 | 1 | 1 |
| 3 | 0 | 0 | 0 |

[ROW] / [COLUMN]

Fig. 7

|  | 1 | 2 | 3 |
|---|---|---|---|
| 1 | 0 | -1 | 0 |
| 2 | 0 | 0 | 0 |
| 3 | 0 | 1 | 0 |

[ROW] / [COLUMN]

Fig. 8

|  | 1 | 2 | 3 |
|---|---|---|---|
| 1 | -1 | -2 | -1 |
| 2 | 0 | 0 | 0 |
| 3 | 1 | 2 | 1 |

[ROW] / [COLUMN]

Fig. 9

|  | 1 | 2 | 3 |
|---|---|---|---|
| 1 | -1 | -1 | -1 |
| 2 | 0 | 0 | 0 |
| 3 | 1 | 1 | 1 |

[ROW] / [COLUMN]

Fig. 10

|  | 1 | 2 | 3 |
|---|---|---|---|
| 1 | 1 | 1 | 1 |
| 2 | 1 | 1 | 1 |
| 3 | 1 | 1 | 1 |

[ROW] / [COLUMN]

Fig. 11

|  | 1 | 2 | 3 |
|---|---|---|---|
| 1 | 0 | 1 | 0 |
| 2 | 1 | -4 | 1 |
| 3 | 0 | 1 | 0 |

[ROW] / [COLUMN]

Fig. 12

|  | 1 | 2 | 3 |
|---|---|---|---|
| 1 | 0 | 1 | 0 |
| 2 | 0 | -2 | 0 |
| 3 | 0 | 1 | 0 |

[ROW] / [COLUMN]

Fig. 13

|  | 1 | 2 | 3 |
|---|---|---|---|
| 1 | 1 | 2 | 1 |
| 2 | -2 | -4 | -2 |
| 3 | 1 | 2 | 1 |

[ROW] / [COLUMN]

Fig. 14

|  | 1 | 2 | 3 |
|---|---|---|---|
| 1 | 1 | 1 | 1 |
| 2 | -2 | -2 | -2 |
| 3 | 1 | 1 | 1 |

[ROW] / [COLUMN]

(a)

(b)

(a)

(b)

(a)

(b)

(a)

(b)

(a)

(b)

(a)

(b)

(a)

(b)

(a)

(b)

(a)

(b)

ULTRASONIC MULTIPHASE FLOWMETER, ULTRASONIC MULTIPHASE FLOW RATE MEASUREMENT PROGRAM, AND MULTIPHASE FLOW RATE MEASUREMENT METHOD USING ULTRASONIC WAVE

TECHNICAL FIELD

The present invention relates to an ultrasonic multiphase flowmeter, an ultrasonic multiphase flow rate measurement program and a multiphase flow rate measurement method using an ultrasonic wave for accurately measuring the flow rate of a multiphase flow.

BACKGROUND ART

Many techniques have been proposed that relate to flowmeters for measuring the amount of a fluid flowing through a flow channel, such as a circular pipe. In particular, a wide variety of flowmeters using an ultrasonic wave have been proposed because they have many advantages over the other measurement systems, such as that they can measure the flow rate of an opaque fluid, that they do not obstruct the flow because they can perform measurement from the outside through the wall of the circular pipe or the like, and that they can be easily attached to an existing circular pipe.

For example, Japanese Patent Laid-Open No. 58-32121 discloses a phase-difference-based ultrasonic flowmeter that comprises an ultrasonic wave transmitter and an ultrasonic wave receiver disposed at an upstream position and a downstream position in a flow channel to face each other at a predetermined distance and an ultrasonic signal transmitter that controls the ultrasonic wave transmitter to oscillate at a constant frequency (Patent Document 1). The ultrasonic flowmeter according to Patent Document 1 determines the flow rate based on the proportional relationship between the average flow velocity of a fluid and the phase difference between the ultrasonic frequencies measured by the ultrasonic wave transmitter and the ultrasonic wave receiver. The ultrasonic wave transmitter oscillates an ultrasonic wave at a predetermined frequency in response to an ultrasonic signal form the ultrasonic signal transmitter, and the ultrasonic wave receiver measures the frequency of the ultrasonic wave having propagated through the fluid. Then, the phase difference between the frequencies of the ultrasonic waves, and the average flow velocity of the fluid is calculated from the calculated phase difference and corrected with a constant correction coefficient to determine the flow rate.

Furthermore, Japanese Patent Laid-Open No. 2000-97742 discloses a Doppler-type ultrasonic flowmeter that comprises ultrasonic wave transmitting means that emits an ultrasonic wave into a fluid with an ultrasonic transducer, flow velocity distribution measuring means that receives a reflected wave from a reflector and measures the flow velocity distribution of the fluid, and a flow rate calculating means that calculates the flow rate from the flow velocity distribution (Patent Document 2). The Doppler-type ultrasonic flowmeter according to Patent Document 2 calculates the flow rate by the flow velocity distribution measuring means obtaining the flow velocity distribution of the fluid at intervals of about 50 to 100 ms and the flow rate calculating means integrating the flow velocity distribution with respect to the cross-sectional area of the flow channel. In addition, to improve the accuracy of the measurement, it has been proposed to use a plurality of ultrasonic transducers for the flow rate measurement.

Patent Document 1: Japanese Patent Laid-Open No. 58-32121
Patent Document 2: Japanese Patent Laid-Open No. 2000-97742

DISCLOSURE OF THE INVENTION

Problems to be Solved by the Invention

The ultrasonic flowmeter according to Patent Document 1 has a problem that the ultrasonic wave cannot reach the receiver because of reflection from an interface between different phases. That is, if there is an interface in a multiphase flow between the ultrasonic wave transmitter and the ultrasonic wave receiver opposed to each other, the flowmeter cannot measure the average flow velocity and therefore cannot determine the flow rate. In addition, the flow of each phase in the multiphase flow varies in a complicated manner, and therefore, the flow velocity distribution significantly varies with time. Thus, there is a problem that an appropriate correction coefficient cannot be selected to perform corrections. For example, in the case of a multiphase flow of a liquid and a gas, the gas phase randomly changes shape in the liquid phase. This phenomenon is equivalent to irregular changes of the shape of the flow channel, and the correction coefficient has to be reset each time the gas phase changes shape. However, it is practically impossible to reset an appropriate correction coefficient each time the gas phase changes shape. Thus, the ultrasonic flowmeter according to Patent Document 1 cannot measure the flow rate of a multiphase flow.

The ultrasonic flowmeter according to Patent Document 2 can accurately measure the flow velocity distribution between the ultrasonic transducer and the interface position. However, the ultrasonic flowmeter has a problem that the flowmeter cannot measure the flow velocity distribution behind the interface because the ultrasonic wave is reflected from the interface as described above. In addition, the flowmeter has a problem that the flowmeter calculates the flow velocity distribution on a false assumption that there is a liquid phase behind the interface because of diffuse reflection of the ultrasonic wave from the flow channel wall or the interface. That is, the flow rate is calculated based on a false flow velocity distribution that is calculated on a false recognition of a gas region actually containing no liquid as a liquid region, and therefore, the error increases. Thus, the ultrasonic flowmeter according to Patent Document 2 cannot accurately measure the flow rate of a multiphase flow.

The present invention has been devised to solve the problems, and an object of the present invention is to provide an ultrasonic multiphase flowmeter, an ultrasonic multiphase flow rate measurement program and a multiphase flow rate measurement method using an ultrasonic wave that can accurately measure the flow rate of a multiphase flow by detecting the position of an interface between phases by an operation processing of at least one of data on a reflected ultrasonic wave and data on a flow velocity distribution.

Means for Solving the Problems

An ultrasonic multiphase flowmeter according to the present invention comprises: a plurality of ultrasonic wave transmitting/receiving means that are disposed on a periphery of a pipe in which a multiphase flow containing a reflector flows, transmit an ultrasonic wave into the multiphase flow and receive at least a reflected wave from the reflector and a reflected wave from an interface in the multiphase flow; flow velocity distribution calculating means that calculates a spatiotemporal flow velocity distribution for a plurality of positions in the direction of transmission of the ultrasonic wave that is substantially continuous in the temporal direction based on data on each reflected wave received by the ultrasonic wave transmitting/receiving means; interface position determining means that has at least any of a difference operation section that performs at least any of a spatial difference operation for a flow velocity distribution at a predetermined time in the spatiotemporal flow velocity distribution and a temporal difference operation for a flow velocity distribution at a predetermined position in the spatiotemporal flow velocity distribution and a binarization operation section that performs a binarization operation to determine whether each flow velocity in the spatiotemporal flow velocity distribution is equal to or lower than a predetermined threshold or not and determines an interface position based on information on the operation; and flow rate calculating means that calculates a flow rate by integrating a part of the spatiotemporal flow velocity distribution up to the interface position determined by the interface position determining means with respect to the cross-sectional area of the pipe.

According to an aspect of the present invention, instead of or in addition to the interface position determining means that has at least any of a difference operation section that performs at least any of a spatial difference operation for a flow velocity distribution at a predetermined time in the spatiotemporal flow velocity distribution and a temporal difference operation for a flow velocity distribution at a predetermined position in the spatiotemporal flow velocity distribution and a binarization operation section that performs a binarization operation to determine whether each flow velocity in the spatiotemporal flow velocity distribution is equal to or lower than a predetermined threshold or not and determines an interface position based on information on the operation, the ultrasonic multiphase flowmeter may comprise interface position determining means that has at least any of an acoustic intensity obtaining section that obtains an acoustic intensity of each reflected wave from the data on each reflected wave received by the ultrasonic wave transmitting/receiving means and a pressure amplitude obtaining section that obtains a pressure amplitude of each reflected wave from the data on each reflected wave received by the ultrasonic wave transmitting/receiving means and determines an interface position by using the fact that the reflected wave from the interface in the multiphase flow has a higher acoustic intensity than the reflected wave from the reflector or by using the fact that the reflected wave from the interface in said multiphase flow has a larger pressure amplitude than the reflected wave from the reflector.

According to an aspect of the present invention, the ultrasonic multiphase flowmeter may comprise phase identifying means that obtains a phase difference between an incident ultrasonic wave and reflected ultrasonic wave at the interface position determined by the interface position determining means and identifies the type of a phase by determining whether the incident wave and the reflected wave are in antiphase or not based on the phase difference.

An ultrasonic multiphase flow rate measurement program according to the present invention makes a computer function as: storage means that stores data on each reflected wave obtained by a plurality of ultrasonic wave transmitting/receiving means disposed on a periphery of a pipe in which a multiphase flow containing a reflector flows transmitting an ultrasonic wave into the multiphase flow and receiving at least a reflected wave from the reflector and a reflected wave from an interface in the multiphase flow; flow velocity distribution calculating means that calculates a spatiotemporal flow velocity distribution for a plurality of positions in the direction of transmission of the ultrasonic wave that is substantially continuous in the temporal direction based on the data on each reflected wave stored in the storage means; interface position determining means that has at least any of a difference operation section that performs at least any of a spatial difference operation for a flow velocity distribution at a predetermined time in the spatiotemporal flow velocity distribution and a temporal difference operation for a flow velocity distribution at a predetermined position in the spatiotemporal flow velocity distribution and a binarization operation section that performs a binarization operation to determine whether each flow velocity in the spatiotemporal flow velocity distribution is equal to or lower than a predetermined threshold or not and determines an interface position based on information on the operation; and flow rate calculating means that calculates a flow rate by integrating a part of the spatiotemporal flow velocity distribution up to the interface position determined by the interface position determining means with respect to the cross-sectional area of the pipe.

According to an aspect of the present invention, instead of or in addition to the interface position determining means that has at least any of a difference operation section that performs at least any of a spatial difference operation for a flow velocity distribution at a predetermined time in the spatiotemporal flow velocity distribution and a temporal difference operation for a flow velocity distribution at a predetermined position in the spatiotemporal flow velocity distribution and a binarization operation section that performs a binarization operation to determine whether each flow velocity in the spatiotemporal flow velocity distribution is equal to or lower than a predetermined threshold or not and determines an interface position based on information on the operation, the ultrasonic multiphase flow rate measurement program may make a computer function as: interface position determining means that has at least any of an acoustic intensity obtaining section that obtains an acoustic intensity of each reflected wave from the data on each reflected wave received by the ultrasonic wave transmitting/receiving means and a pressure amplitude obtaining section that obtains a pressure amplitude of each reflected wave from the data on each reflected wave received by the ultrasonic wave transmitting/receiving means and determines an interface position by using the fact that the reflected wave from the interface in the multiphase flow has a higher acoustic intensity than the reflected wave from the reflector or by using the fact that the reflected wave from the interface in said multiphase flow has a larger pressure amplitude than the reflected wave from the reflector.

A multiphase flow rate measuring method using an ultrasonic wave according to the present invention comprises: an ultrasonic wave transmitting/receiving step of a plurality of ultrasonic wave transmitting/receiving means disposed on a periphery of a pipe in which a multiphase flow containing a reflector flows transmitting an ultrasonic wave into the multiphase flow and receiving at least a reflected wave from the reflector and a reflected wave from an interface in the multiphase flow; a flow velocity distribution calculating step of calculating a spatiotemporal flow velocity distribution for a plurality of positions in the direction of transmission of the ultrasonic wave that is substantially continuous in the temporal direction based on data on each reflected wave received by the ultrasonic wave transmitting/receiving means; an interface position determining step of performing at least any of at least any of a spatial difference operation for a flow velocity distribution at a predetermined time in the spatiotemporal flow velocity distribution and a temporal difference operation for a flow velocity distribution at a predetermined position in the spatiotemporal flow velocity distribution and a binarization operation to determine whether each flow velocity in the spatiotemporal flow velocity distribution is equal to or lower than a predetermined threshold or not and determining an interface position based on information on the operation; and a flow rate calculating step of calculating a flow rate by integrating a part of the spatiotemporal flow velocity distribution up to the interface position determined by the interface position determining means with respect to the cross-sectional area of the pipe.

According to an aspect of the present invention, instead of or in addition to the interface position determining step of performing at least any of at least any of a spatial difference operation for a flow velocity distribution at a predetermined time in the spatiotemporal flow velocity distribution and a temporal difference operation for a flow velocity distribution at a predetermined position in the spatiotemporal flow velocity distribution and a binarization operation to determine whether each flow velocity in the spatiotemporal flow velocity distribution is equal to or lower than a predetermined threshold or not and determining an interface position based on information on the operation, the multiphase flow rate measuring method using an ultrasonic wave may comprise an interface position determining step of obtaining at least any of an acoustic intensity of each reflected wave from the data on each reflected wave received in the ultrasonic wave transmitting/receiving step and a pressure amplitude of each reflected wave from the data on each reflected wave received in the ultrasonic wave transmitting/receiving step and determining an interface position by using the fact that the reflected wave from the interface in the multiphase flow has a higher acoustic intensity than the reflected wave from the reflector or by using the fact that the reflected wave from the interface in said multiphase flow has a larger pressure amplitude than the reflected wave from the reflector.

Advantages of the Invention

The present invention provides an ultrasonic multiphase flowmeter, an ultrasonic multiphase flow rate measurement program and a multiphase flow rate measurement method using an ultrasonic wave that can accurately measure the flow rate of a multiphase flow by detecting the position of an interface between phases by an operation processing of at least one of data on a reflected ultrasonic wave and data on a flow velocity distribution.

BEST MODE FOR CARRYING OUT THE INVENTION

In the following, an ultrasonic multiphase flowmeter, an ultrasonic multiphase flow rate measurement program and a multiphase flow rate measurement method using an ultrasonic wave according to an embodiment of the present invention will be described with reference to the drawings. FIG. 1 is a block diagram showing a configuration of an ultrasonic multiphase flowmeter 1 according to this embodiment.

This embodiment is configured to measure the flow rate of a two-phase flow of a liquid W and a gas G in a circular pipe P shown in FIG. 2. However, according to the present invention, the cross-sectional shape and the material of the pipe to be measured are not limited to particular ones. The cross sectional shape of the pipe is not limited to the circular shape but may be an approximately circular, elliptical, polygonal or crescent shape, for example. And the material of the pipe may be a single metal, an alloy or a resin, for example. The term "multiphase" used in the present invention is not limited to a particular meaning but may mean gas-liquid two-phase, liquid-liquid two-phase, liquid-solid two-phase, gas-solid two-phase or gas-liquid-solid three-phase. An example of the liquid-liquid two-phase flow is a two-phase flow of a liquid of polar molecules and a liquid of non-polar molecules, such as water and an oil or an organic solvent.

The ultrasonic multiphase flowmeter 1 according to this embodiment comprises ultrasonic wave transmitting/receiving means 2 that transmits an ultrasonic wave and receives at least a reflected wave from a reflector and a reflected wave from an interface in a multiphase flow, display means 3 that displays various types of data or the like, input means 4 used by a user to input various types of commands, storage means 5 that stores various types of data, operation processing means 6 that performs various types of operation processings, flow velocity distribution calculating means 7 that calculates a flow velocity distribution, interface position determining means 8 that determines an interface position, flow rate calculating means 9 that calculates a flow rate from the flow velocity distribution and the interface position, and phase identifying means 10 that identifies the type of the phases forming the interface.

An ultrasonic multiphase flow rate measurement program 1a according to this embodiment is stored in a program storage section 51 of the storage means 5 and makes the storage means 5 that stores various types of data, the flow velocity distribution calculating means 7 that calculates the flow velocity distribution, the interface position determining means 8 that determines the interface position, the flow rate calculating means 9 that calculates the flow rate from the flow velocity distribution and the interface position, and the phase identifying means 10 that identifies the type of the phases forming the interface perform their respective functions.

In the following, among other configurations according to this embodiment, a configuration of the ultrasonic multiphase flowmeter 1 will be described in detail.

As shown in FIGS. 2 and 3, the ultrasonic wave transmitting/receiving means 2 has an ultrasonic transducer 21 that transmits an ultrasonic wave and receives at least a reflected wave from a reflector and a reflected wave from an interface in a multiphase flow, a transducer holder 22 that places and fixes the ultrasonic transducer 21 on the periphery of a circular pipe P, and a reverberation ultrasonic wave absorbing sheet 23 that removes a reverberation ultrasonic wave.

The ultrasonic transducer 21 according to this embodiment has a substantially cylindrical shape and has an oscillating element (not shown) that generates an arbitrary ultrasonic wave on the tip end face. When an oscillating voltage is applied to the oscillating element, the oscillating element can oscillate at a frequency corresponding to the frequency of the voltage. For example, when a voltage oscillating at a predetermined frequency, such as 1 MHz, 2 MHz and 4 MHz, to the oscillating element, the oscillating element transmits an ultrasonic pulse having the same wavelength at the same frequency. In addition, when an oscillation is applied to the oscillating element, the oscillating element can generate a voltage corresponding to the oscillation. That is, when the oscillating element receives a reflected wave from a reflector (not shown) flowing in a fluid or a reflected wave from the interface in the fluid, the oscillating element generates a voltage corresponding to the oscillation of the reflected wave.

The term "reflector" used in the present invention means an object that reflects an ultrasonic wave, which may be a small bubble of air or any other gas, such as hydrogen, or a small particle of any material, such as nylon and glass, for example.

According to this embodiment, as shown in FIG. 3, a plurality of ultrasonic transducers 21 is disposed on the periphery of the circular pipe P to cover at least 180 degrees around the circular pipe P. The number of ultrasonic transducers 21 disposed is not particularly limited and can be determined by assuming a void coefficient $\alpha_g$, which is the volume ratio between the phases, the shapes of the phases, the number of phases, and the like.

In the following, a method of determining the number of ultrasonic transducers 21 when the void coefficient $\alpha_g$, the shapes of the phases, the number of phases, and a discretization error e are assumed will be described.

In the case where a two-phase flow of a liquid phase W and a gas phase G in a circular pipe P is assumed as shown in FIG. 4, the void coefficient $\alpha$ is expressed by the following expression using a distance $h(\theta)$ from the wall of the pipe to the interface position.

$$\hat{\alpha} = \frac{1}{\pi R^2}\left(\pi R^2 - \frac{1}{2}\int_0^{2\pi}\int_{R-h(\theta)}^R |r|drd\theta\right) = \quad \text{[Expression 1]}$$
$$1 - \frac{1}{2\pi R^2}\int_0^{2\pi}\int_{R-h(\theta)}^R |r|drd\theta$$

In this expression, R represents the radius of the circular pipe P, and r (not shown in the drawing) represents the distance from the central axis of the circular pipe P. The integral expression 1 is discretized as follows by using a measurement line number n (=1, 2, 3, . . . ), which is the number of measurement lines L that corresponds to the number of ultrasonic transducers 21.

$$\hat{\alpha}_g = \frac{1}{2} + \frac{1}{4\pi R^2}\int_0^{2\pi}|R - h(\theta)|(R - h(\theta))d\theta \approx \quad \text{[Expression 2]}$$
$$\frac{1}{2} + \frac{1}{4n}\sum_{i=1}^n |R - h(\theta_i)|(R - h(\theta_i))$$

The character i (=1, 2, 3, . . . ) in the expression 2 is a subscript assigned to each measurement line L. The assumed void coefficient $\alpha$ of the flow calculated according to the expression 1, the void coefficient $\alpha_g$ based on the number n of ultrasonic transducers 21 is calculated according to the expression 2, and the error e is calculated according to an equation $e=(1-\alpha_g/\alpha)$. Then, the number n of ultrasonic transducers 21 can be determined in such a manner that the discretization error e falls within a predetermined range.

The method of determining the number of ultrasonic transducers 21 is not limited to the method described above. In general, as the number of ultrasonic transducers 21 increases, the error e becomes smaller. However, at the same time, the manufacturing cost also increases. Thus, an appropriate number of ultrasonic transducers 21 is determined based on the trade-off between the error e and the manufacturing cost.

Next, the transducer holder 22 will be described. The transducer holder 22 according to this embodiment is configured to place and fix a plurality of ultrasonic transducers 21 on the periphery of the circular pipe P in positions inclined at a common angle with respect to the flow direction and oriented toward a common point on the central axis of the circular pipe P. The transducer holder 22 is not limited to a particular configuration as far as it can place and fix an ultrasonic transducer 21 on the periphery of a pipe. To improve transmission of the ultrasonic wave, an ultrasonic gel (not shown) is applied between the tip end of the ultrasonic transducer 21 and the circular pipe P. However, the ultrasonic multiphase flowmeter 1 according to the present invention is not limited to this implementation.

The reverberation ultrasonic wave absorbing sheet 23 is intended to remove a reverberation ultrasonic wave that is repeatedly reflected in the circular pipe P. The reverberation ultrasonic wave absorbing sheet 23 is made of a resin, such as rubber, and is disposed on the outer surface of the circular pipe P at upstream and downstream positions of the transducer holder 22 close to the transducer holder 22. The material and position of the reverberation ultrasonic wave absorbing sheet 23 can be appropriately determined.

The display means 3 according to this embodiment is a cathode ray tube or liquid crystal display apparatus, for example. Various types of data obtained by the flow velocity distribution calculating means 7, the interface position determining means 8, the flow rate calculating means 9 and the phase identifying means 10 forming the operation processing means 6 may be directly displayed on the display means 3 or temporarily stored in a data storage section 52 of the storage means 5, transmitted back to the operation processing means 6 and then displayed on the display means 3.

The input means 4 according to this embodiment is used for manipulating the operation processing means 6. The input means 4 is a keyboard, a mouse or a touch panel, for example. Based on the various types of data displayed on the display means 3, the user of the ultrasonic multiphase flowmeter 1 according to this embodiment can manipulates a difference operation section 81, a binarization operation section 82, an acoustic intensity obtaining section 83 and a pressure amplitude obtaining section 84 of the interface position determining means 8, thereby determining the interface position or inputting a threshold used in the binarization operation section 82, for example.

Next, means common to the ultrasonic multiphase flowmeter 1 and the ultrasonic multiphase flow rate measurement program 1a according to this embodiment will be described.

The storage means 5 according to this embodiment is a data storage apparatus, such as a ROM, a RAM and a hard disk drive, and has the program storage section 51 that stores the ultrasonic multiphase flow rate measurement program 1a and the data storage section 52 that stores various types of data. The data storage section 52 stores data on each reflected wave received by the ultrasonic wave transmitting/receiving means 2, data on the flow velocity distribution calculated by the flow velocity distribution calculating means 7, data on the interface position determined by the interface position determining means 8, data on the flow rate calculated by the flow rate calculating means 9, and identification data produced by the phase identifying means 10, for example.

The operation processing means 6 according to this embodiment is an operation processing apparatus, such as a central processing unit (CPU), and functions as the flow velocity distribution calculating means 7, the interface position determining means 8, the flow rate calculating means 9 and the phase identifying means 10 according to the ultrasonic multiphase flow rate measurement program 1a read from the program storage section 51.

The flow velocity distribution calculating means 7 according to this embodiment has a function of calculating a spatiotemporal flow velocity distribution for a plurality of positions in the direction of transmission of the ultrasonic wave in the circular pipe P that is substantially temporally continuous based on the data of each reflected wave received by the ultrasonic wave transmitting receiving means 2. More specifically, the flow velocity distribution calculating means 7 has a function of reading out the reflected wave data for each of the plurality of ultrasonic transducers 21 placed on and fixed to the periphery of the circular pipe P, using the reflected wave data to determine the Doppler frequency in each of the reflected waves from a plurality of different positions in the direction of transmission of the ultrasonic pulse on the assumption that reflected waves at different positions in the direction of transmission of the ultrasonic pulse contain different Doppler frequencies that depend on the flow velocity at their respective positions, and calculating the flow velocity at each of the plurality of positions from the Doppler frequency. This function enables determination of a spatiotemporal flow velocity distribution for a plurality of positions in the direction of transmission of the ultrasonic pulse (in the spatial direction) that is substantially continuous in the temporal direction. Alternatively, the spatiotemporal flow velocity distribution in the direction of transmission of the ultrasonic wave may be determined by determining the moving velocity of the reflector from the time from transmission of the ultrasonic wave to reception of a reflected wave from a reflector and a reflected wave from the interface in the multiphase flow.

The interface position determining means 8 according to this embodiment has the difference operation section 81 that determines the interface position from a spatial difference for a flow velocity distribution at a predetermined time in the spatiotemporal flow velocity distribution calculated by the flow velocity distribution calculating means 7 or a temporal difference for a flow velocity distribution at a predetermined position in the spatiotemporal flow velocity distribution, a binarization operation section 82 that determines whether each flow velocity in the spatiotemporal flow velocity distribution is equal to or lower than a predetermined threshold or not, and the acoustic intensity obtaining section 83 and the pressure amplitude obtaining section 84 that determine the interface position based on the information on the operation.

The difference operation section 81 according to this embodiment has a function of performing a difference operation of the spatiotemporal flow velocity distribution calculated by the flow velocity distribution calculating means 7 using a filter function to determine the interface position. The difference operation section 81 determines the interface position by using the fact that when an ultrasonic wave is reflected from an interface, the incident wave and the reflected wave interfere with each other to produce a local standing wave having an extremely small amplitude, and the calculated flow velocity at the interface position in the spatiotemporal flow velocity distribution is zero because the Doppler frequency cannot be detected in the region of the local standing wave as shown in FIG. 5. That is, the flow velocity distribution at a predetermined time is discontinuous or abruptly changes at the interface position, so that the spatial difference value is at a maximum. On the other hand, the flow velocity at a predetermined position is zero at the interface position, so that the temporal difference value is at a minimum.

The operation performed by the difference operation section 81 is not limited to the difference operation using the filter function, but the difference operation section 81 can have a function of determining a maximum or a minimum by any difference operation in the spatial direction, the temporal direction or the spatiotemporal direction.

Next, a filter function used in the difference operation section 81 according to this embodiment will be described.

In general, a filter function is used for detection of an edge of a two-dimensional image in a two-dimensional spatial coordinate system with an X axis and a Y axis, for example, and is composed of a square matrix of 3 rows and 3 columns based on a difference operation, for example. The filter function can determine a maximum/minimum value at the center of the matrix by a two-dimensional difference operation in the X direction and the Y direction using peripheral data.

The filter function according to this embodiment is composed of a matrix of 3 rows and 3 columns as shown in FIGS. 6 to 15 and is used to determine a maximum/minimum value in a flow velocity distribution in a two-dimensional spatiotemporal coordinate system in which the abscissa is the temporal axis, and the ordinate is the spatial axis shown in FIG. 21. Although the filter function is a square matrix of 3 rows and 3 columns in this embodiment, the filter function according to the present invention is not limited thereto, and the filter function may be a matrix of 5 rows in the temporal direction and 5 columns in the spatial direction or a matrix of 7 rows in the temporal direction and 7 columns in the spatial direction, for example.

Alternatively, the filter function according to this embodiment may be based on a spatial first-order one-sided difference, a spatial second-order central difference, a normal Sobel difference (a temporally diffused spatially gradient difference), an enhanced Sobel difference (a temporally highly diffused temporally gradient difference), a surface average difference (a spatiotemporally averaged difference), a two-dimensional Laplacian difference, a spatial Laplacian difference, a spatiotemporal Laplacian difference (a temporally diffused spatial Laplacian difference), an enhanced spatiotemporal Laplacian difference, or a frog spatiotemporal Laplacian difference, for example.

Next, taking the spatial first-order one-sided difference as an example, a specific processing method using the filter function according to this embodiment will be described. In the matrix of the filter function based on the spatial first-order one-sided difference, all the elements in the first row assume a value of $-1$, all the elements in the second row assume a value of 1, and all the elements in the third row assume a value of 0 as shown in FIG. 6.

This is based on a relation $g(t, x)=f(t, x)-f(t, x-1)$, where $g(t, x)$ is a maximum/minimum value of a spatiotemporal flow velocity distribution at a predetermined position $(t, x)$ determined as the spatial first-order one-sided difference of the flow velocity $f$, where the character $t$ ($=1, 2, 3, \ldots$) denotes a temporal position, and the character $x$ ($=1, 2, 3, \ldots$) denotes a spatial position. That is, the spatial first-order one-sided difference indicates the difference between a spatial position $(x)$ and a spatial position $(x-1)$.

Next, a method of calculating the maximum/minimum value $g(t, x)$ at the predetermined position $(t, x)$ according to the spatial first-order one-sided difference will be described: The maximum/minimum value $g(t, x)$ of the spatiotemporal flow velocity distribution at the predetermined position $(t, x)$ is determined by summing the flow velocities $f(t-1, x-1)$, $f(t, x-1)$ and $f(t+1, x-1)$ for the first to third columns in the first row of the filter function multiplied by $-1$, the flow velocities $f(t-1, x)$, $f(t, x)$ and $f(t+1, x)$ for the first to third columns in the second row of the filter function multiplied by 1, and the flow velocities $f(t-1, x+1)$, $f(t, x+1)$ and $f(t+1, x+1)$ for the first to third columns in the third row of the filter function multiplied by 0.

As the maximum/minimum value $g(t, x)$ of the flow velocity distribution increases, the differences between the flow velocity $f(t, x)$ at the predetermined position $(t, x)$ and the flow velocities $f(t-1, x-1)$, $f(t, x-1)$, $f(t+1, x-1)$, $f(t-1, x)$, $f(t+1, x)$, $f(t-1, x+1)$, $f(t, x+1)$ and $f(t+1, x+1)$ at the peripheral positions increase, and a discontinuity of an abrupt change is more likely to occur at the predetermined position $(t, x)$ in the spatiotemporal flow velocity distribution.

The interface position can be determined by performing the calculation of the maximum/minimum value $g(t, x)$ described above for the entire spatiotemporal flow velocity distribution and selecting a point at which the value g(t, x) is equal to or larger than a predetermined threshold.

In the case where the filter function is based on the surface average difference, the method of calculating the maximum/minimum value g(t, x) involves dividing by 9, which is the number of matrix elements, the sum of the products of the flow velocities and the corresponding filter function values. In the case where the filter function is based on the temporal difference at the predetermined position (t, x), the interface position can be determined by selecting a point at which the resulting value g(t, x) is equal to or larger than a predetermined threshold.

In the following, differences on which filter functions are based and matrices of the filter functions will be summarized.

The spatial second-order central difference is to take a second-order central difference in the spatial direction and is based on the flow velocity difference between spatial positions (x−1) and (x+1). Specifically, as shown in FIG. 7, in the matrix of the filter function based on the spatial second-order central difference, the elements in the first and third columns in the first row assume a value of 0, the element in the second column in the first row assumes a value of −1, the elements in all the columns in the second row assume a value of 0, the elements in the first and third columns in the third row assume a value of 0, and the element in the second column in the third row assumes a value of 1.

The normal Sobel difference is to take a second-order central difference in the spatial direction and take an average in the temporal direction and is based on the flow velocity difference between spatial positions (x−1) and (x+1). Specifically, as shown in FIG. 8, in the matrix of the filter function based on the normal Sobel difference, the elements in the first and third columns in the first row assume a value of −1, the element in the second column in the first row assumes a value of −2, the elements in all the columns in the second row assume a value of 0, the elements in the first and third columns in the third row assume a value of 1, and the element in the second column in the third row assumes a value of 2.

The enhanced Sobel difference is intended to enhance the averaging in the temporal direction of the normal Sobel difference and is based on the flow velocity difference between spatial positions (x−1) and (x+1). Specifically, as shown in FIG. 9, in the matrix of the filter function based on the enhanced Sobel difference, the elements in all the columns in the first row assume a value of −1, the elements in all the columns in the second row assume a value of 1, and the elements in all the columns in the third row assume a value of 1.

The surface average difference is to average the flow velocity distribution to remove noise, such as a loss of flow velocity data, in the spatiotemporal flow velocity distribution caused by a measuring instrument. Specifically, as shown in FIG. 10, all the elements in the matrix of the filter function based on the surface average difference assume a value of 1.

The two-dimensional Laplacian difference is to take differences in the spatial direction and in the temporal direction by the second-order differential and is based on the flow velocity differences between spatial positions (x−1) and (x) and between spatial positions (x) and (x+1) and on the flow velocity differences between temporal positions (t−1) and (t) and between (t) and (t+1). Specifically, as shown in FIG. 11, in the matrix of the filter function based on the two-dimensional Laplacian difference, the elements in the first and third columns in the first row assume a value of 0, the element in the second column in the first row assumes a value of 1, the elements in the first and third columns in the second row assume a value of 1, the element in the second column in the second row assumes a value of −4, the elements in the first and third columns in the third row assume a value of 0, and the element in the second column in the third row assumes a value of 1.

The spatial Laplacian difference is to take differences in the spatial direction by the second-order differential and is based on the flow velocity differences between spatial positions (x−1) and (x) and between spatial positions (x) and (x+1). Specifically, as shown in FIG. 12, in the matrix of the filter function based on the spatial Laplacian difference, the elements in the first and third columns in the first row assume a value of 0, the element in the second column in the first row assumes a value of 1, the elements in the first and third columns in the second row assume a value of 0, the element in the second column in the second row assumes a value of −2, the elements in the first and third columns in the third row assume a value of 0, and the element in the second column in the third row assumes a value of 1.

The spatiotemporal Laplacian difference is to take differences in the spatial direction and in the temporal direction by the second-order differential and averaging in the temporal direction and is based on the flow velocity differences between spatial positions (x−1) and (x) and between spatial positions (x) and (x+1) and on the flow velocity differences between temporal positions (t−1) and (t) and between (t) and (t+1). Specifically, as shown in FIG. 13, in the matrix of the filter function based on the spatiotemporal Laplacian difference, the elements in the first and third columns in the first row assume a value of 1, the element in the second column in the first row assumes a value of 2, the elements in the first and, third columns in the second row assumes a value of −2, the element in the second column in the second row assume a value of −4, the elements in the first and third columns in the third row assume a value of 1, and the element in the second column in the third row assumes a value of 2.

The enhanced spatiotemporal Laplacian difference is intended to enhance the averaging in the temporal direction of the spatiotemporal Laplacian difference and is based on the flow velocity differences between spatial positions (x−1) and (x) and between spatial positions (x) and (x+1) and on the flow velocity differences between temporal positions (t−1) and (t) and between (t) and (t+1). Specifically, as shown in FIG. 14, in the matrix of the filter function based on the enhanced spatiotemporal Laplacian difference, the elements in all the columns in the first row assume a value of 1, the element in all the columns in the second row assume a value of −2, and the elements in all the columns in the third row assume a value of 1.

The frog spatiotemporal Laplacian difference is to take a difference according to the leapfrog scheme and is based on the flow velocity differences between spatial positions (x−1) and (x) and between spatial positions (x) and (x+1) and on the flow velocity differences between temporal positions (t−1) and (t) and between (t) and (t+1). Specifically, as shown in FIG. 15, in the matrix of the filter function based on the frog spatiotemporal Laplacian difference, the elements in the first and third columns in the first row assume a value of 1, the element in the second column in the first row assumes a value of 0, the elements in the first and third columns in the second row assume a value of −2, the element in the second column in the second row assume a value of 0, the elements in the first and third columns in the third row assume a value of 1, and the element in the second column in the third row assumes a value of 0.

Although several filter functions used for the difference operation have been listed above, the present invention is not limited thereto and can use any appropriate filter function.

The binarization operation section 82 according to this embodiment has a function of performing a binarization operation of the spatiotemporal flow velocity distribution calculated by the flow velocity distribution calculating means 7 to determine the interface position. More specifically, the binarization operation section 82 sets an appropriate threshold and determines a position where the flow velocity in the spatiotemporal flow velocity distribution is equal to or smaller than the threshold as the interface position.

The acoustic intensity obtaining section 83 according to this embodiment has a function of obtaining the acoustic intensity of the reflected wave from each piece of reflected wave data obtained by the ultrasonic wave transmitting/receiving means 2 to determine the interface position. The acoustic intensity obtaining section 83 determines the interface position based on the acoustic intensity by taking advantage of the fact that a reflected wave from an interface has a higher acoustic intensity than a reflected wave from a reflector. That is, the acoustic intensity of the reflected wave is compared with a predetermined value at each position and at each point in time, and a position at which the acoustic intensity is higher than the predetermined value is determined as the interface position.

The pressure amplitude obtaining section 84 according to this embodiment has a function of obtaining the pressure amplitude of the reflected wave from each piece of reflected wave data obtained by the ultrasonic wave transmitting/receiving means 2 to determine the interface position. The pressure amplitude obtaining section 84 determines the interface position based on the pressure amplitude by taking advantage of the fact that a reflected wave from an interface has a larger pressure amplitude than a reflected wave from a reflector. That is, the pressure amplitude of the reflected wave is compared with a predetermined value at each position and at each point in time, and a position at which the pressure amplitude is larger than the predetermined value is determined as the interface position.

The interface position determining means 8 can determine the interface position by any one of the difference operation section 81, the binarization operation section 82, the acoustic intensity obtaining section 83 and the pressure amplitude obtaining section 84 or a combination of two or more thereof in order to improve the accuracy.

The flow rate calculating means 9 according to this embodiment has a function of calculating the flow rate from the flow velocity distribution calculated by the flow velocity distribution calculating means 7 and the interface position determined by the interface position determining means 8. More specifically, the flow rate is calculated by integrating the flow velocity distribution up to the interface position with respect to the cross-sectional area.

Expressions for calculating the flow rate used by the flow rate calculating means 9 according to the present invention will be shown below.

For a single-phase flow, the flow rate Q is determined according to the following expression.

$$Q = \int_A v \cdot dA \qquad \text{[Expression 3]}$$

In this expression, the character v represents the flow velocity determined by the flow velocity distribution calculating means 7. The character A represents the cross-sectional area of the pipe.

On the other hand, for a multiphase flow, the flow rate is determined according to the following expression.

$$Q_k = \int_A f_k \cdot v \cdot dA \qquad \text{[Expression 4]}$$

In this expression, the subscript k indicates the phase of the fluid to be measured. The character $f_k$ represents a phase exponential function that indicates whether there is a fluid to be measured or not and assumes a value of 0 or 1. According to the present invention, the phase exponential function $f_k$ is determined by the interface position determined by the interface position determining means 8.

For example, it is assumed that the subscript k=1 when the phase of the fluid to be measured is liquid, and the subscript k=2 when the phase of the fluid to be measured is gas. Then, the flow rate of each phase is expressed as follows.

$$Q_1 = \int_A f_1 \cdot v \cdot dA \quad Q_2 = \int_A f_2 \cdot v \cdot dA \qquad \text{[Expression 5]}$$

The phase exponential function $f_k$ in the expression 5 is defined as follows.

1) $f_1=1$ when the point of measurement is in the liquid phase, and $f_1=0$ when the point of measurement is in the gas phase.

2) $f_2=1$ when the point of measurement is in the gas phase, and $f_2=0$ when the point of measurement is in the liquid phase.

Thus, the flow rate calculating means 9 according to the present invention calculates the flow rate of each phase by substituting the flow velocity distribution calculated by the flow velocity distribution calculating means 7 and the phase exponential function $f_k$ determined from the interface position determined by the interface position determining means 8 into the expression 4. Furthermore, the flow rate calculating means 9 can calculate the flow rate of a three-phase flow of a gas phase, a liquid phase and a solid phase or the flow rate of a two-phase flow of phases of the same type, such as a liquid-liquid two-phase flow of water and oil.

The phase identifying means 10 according to this embodiment has a function of identifying the type of the phases forming the interface and has a phase difference obtaining section 11 and a phase identifying section 12. Specifically, the phase identifying means 10 identifies the type of the phases based on the phase difference between the incident wave and the reflected wave caused by the difference in acoustic impedance that indicates the degree of sound transmissibility of sound between different phases. More specifically, when a wave propagating through a phase having a lower acoustic impedance is incident on a phase having a higher acoustic impedance and reflected therefrom, the incident wave and the reflected wave oscillate in phase. However, when a wave propagating through a phase having a higher acoustic impedance is incident on a phase having a lower acoustic impedance and reflected therefrom, the incident wave and the reflected wave oscillate in anti-phase. Therefore, the type of the phases forming the interface can be identified by obtaining the phase of the oscillation of the incident wave and the reflected wave at the interface position.

The phase difference obtaining section 11 of the phase identifying means 10 according to this embodiment has a function of obtaining the waveforms of the incident ultrasonic wave and the reflected ultrasonic wave at the interface position from each piece of reflected wave data obtained by the ultrasonic wave transmitting/receiving means 2 to determine the phase difference between the incident and reflected waves. The phase identifying section 12 of the phase identifying means according to this embodiment has a function of identifying the type of the phases forming the interface based on the phase difference determined by the phase difference obtaining section 11.

Next, an ultrasonic multiphase flow rate measurement method using the ultrasonic multiphase flowmeter 1 according to this embodiment will be described with reference to the flow chart of FIG. 16.

First, a plurality of ultrasonic transducers 21 transmit ultrasonic pulses into a multiphase flow substantially continuously at predetermined time intervals and receive a reflected wave from a reflector and a reflected wave from an interface in the multiphase flow. The plurality of ultrasonic transducers 21 perform the transmission and reception of the ultrasonic wave substantially at the same time (ultrasonic wave transmitting/receiving step S1).

Each ultrasonic transducer 21 stores each received reflected wave in the data storage section 51 as reflected wave data (reflected wave data storing step S2).

Then, the flow velocity distribution calculating means 7 reads out the reflected wave data from the data storage section 52, determines the Doppler frequency in each of the reflected waves from a plurality of different positions in the direction of transmission of the ultrasonic wave on the assumption that reflected waves from different positions in the direction of transmission of the ultrasonic wave contain different Doppler frequencies that depend on the flow velocity at their respective positions, calculates the flow velocity at each position from the Doppler frequency, calculates a substantially continuous flow velocity distribution that is substantially continuous in the temporal direction for the plurality of positions in the direction of transmission of the ultrasonic pulse, and stores the flow velocity distribution in the data storage section 52 (flow velocity distribution calculating step S3).

The interface position determining means 8 reads out the flow velocity distribution data or the reflected wave data from the data storage section 52, performs at least any of the difference operation and the binarization operation of the flow velocity distribution, obtains at least any of the acoustic intensity and the pressure amplitude from the reflected wave data as an alternative to or in addition to the operation described above, determines the interface position based on at least any of the information on the operation and the obtained information, and stores the interface position in the data storage section 52 (interface position determining step S4). The user can arbitrarily choose which sections to use from among the difference operation section 81, the binarization operation section 82, the acoustic intensity obtaining section 83 and the pressure amplitude obtaining section 84 through the input means 4.

Then, the flow rate calculating means 9 reads out the flow velocity distribution data and the interface position data from the data storage section 52, calculates the flow rate of the liquid phase by integrating the flow velocity distribution up to the interface position with respect to the cross-sectional area, and stores the flow rate in the data storage section 52 (flow rate calculating step S5). In this way, the flow rate of the liquid phase that varies with time can be measured. In addition, the flow rate of the gas phase can also be calculated from the relationship between the flow rate of the liquid phase and the cross-sectional area of the pipe.

In identification of the type of the phases of a multiphase flow, the phase identifying means 10 reads out the reflected wave data and the interface position data from the data storage section 52, obtains the phase difference of the oscillations of the incident wave and the reflected wave at the interface position (phase difference obtaining step S6), identifies the type of each phase forming interface based on the phase difference, and stores the identification result in the data storage section 52 (phase identifying step S7). In this embodiment, for example, the phases forming the interface are identified as a liquid phase and a gas phase when the phase of the reflected wave is inverted at the interface position, and the phases forming the interface are identified as a liquid phase and a solid phase when the phase of the reflected wave is not inverted at the interface position.

The reflected wave data, the flow velocity distribution, the flow rate and the types of the phases forming the interface stored in the data storage section. 52 can be displayed on the display means 3 in real time. The user can select from among the sections of the interface position determining means 8 and input a command, such as a threshold, used by the binarization operation section 82 through the input means 4 based on the various types of data displayed on the display means 3.

The embodiment described above provides the following advantages.

1. The position of the interface between the phases of the multiphase flow can be accurately determined.
2. The flow rate of each phase of the multiphase flow can be accurately calculated.
3. The type of the phases forming the interface can be identified.
4. The user can check the results of measurement in real time.

Next, as practical examples, specific experimental examples of the embodiment described above will be described.

Practical Example 1

<Model Experiment Based on Numerical Analysis>

First, a model experiment based on numerical analysis will be described with reference to FIG. 17.

In the model experiment, numerical analysis was performed for a given void coefficient $\alpha$ and a given number g of gas phases, the distance $h(\theta)$ from the pipe wall to the interface position was determined based on the result of the numerical analysis, and the void coefficient $\alpha_g$ was calculated according to the expression 2.

FIGS. 17(*a*) to 17(*d*) are cross-sectional views of a liquid phase and a gas phase(s) at a predetermined point in time obtained by numerical analysis performed under analysis conditions A to D shown below, respectively. The white part represents a gas phase. The lines connecting the wall of the circular pipe and the center of the circular pipe are measurement lines L.

The analysis condition A is that the void coefficient $\alpha$ is about 0.337, the number g of gas phases is 1, and the number n of measurement lines is 6. The analysis condition B is that the void coefficient $\alpha$ is about 0.382, the number g of gas phases is 2, and the number n of measurement lines is 6, the analysis condition C is that the void coefficient $\alpha$ is about 0.176, the number g of gas phases is 1, and the number n of measurement lines is 18, and the analysis condition D is that the void coefficient $\alpha$ is about 0.406, the number g of gas phases is 3, and the number n of measurement lines is 18.

The error was determined from the void coefficient $\alpha$ given as the analysis condition and the void coefficient $\alpha_g$ determined according to the expression 2, and the analysis conditions were investigated by comparison of the error. The error e was determined according to $e=(1-\alpha_g/\alpha)$.

The analysis conditions A and B are equal in number n of measurement lines. Under the analysis condition A, the void coefficient $\alpha_g$ determined according to the expression 2 was about 0.343, and the error e with respect to the void coefficient $\alpha$ given as the analysis condition was about +0.016. On the other hand, under the analysis condition B, $\alpha_g \approx 0.413$, and $e \approx +0.08$. That is, whereas the error was about 1.6% under the analysis condition A, the error was about 8% under the analysis condition B. The error e increased under the analysis condition B.

Similarly, the analysis conditions C and D that are equal in number n of measurement lines were investigated by comparison. Under the analysis condition C, $\alpha_g \approx 0.175$, and $e \approx -0.004$. Under the analysis condition D, $\alpha_g \approx 0.413$, and $e \approx +0.018$. The error e increased under the analysis condition D.

The number g of gas phases can be considered as a key factor of the increase in error e. This is because the interface reflects the ultrasonic wave, so that no reflected wave from behind the interface is available, and therefore, the void coefficient is calculated on a false assumption that a liquid-phase region is falsely recognized as a gas-phase region.

However, under the analysis condition B, the error e decreased from +0.08 to +0.018, although the number g of gas phases increased from 2 to 3, compared with the analysis condition D. The number n of measurement lines can be considered as a key factor of the decrease in error e. That is, it can be considered that increasing the number n of measurement lines enlarged the region available for the measurement.

As can be seen from the result described above, the error of the void coefficient increases as the number of gas phases in the multiphase flow increases, and the increase in error can be reduced by increasing the number n of measurement lines.

Practical Example 2

<Relationship Between Void Coefficient $\alpha_g$ and Error>

Next, the void coefficient $\alpha_g$ and the error e were calculated by performing numerical analysis by changing the void coefficient $\alpha$ and the number g of gas phases, and the tendency thereof was investigated by comparison. FIG. 18 is a plot showing a relationship between the void coefficient $\alpha_g$ and the error e, in which the abscissa indicates the void coefficient $\alpha_g$, and the ordinate indicates the error e. Except for some deviations, the error e statistically tends to decrease as the void coefficient $\alpha_g$ decreases. This is probably because the region available for the measurement increases as the number g of gas phases decrease or the total size of the gas phases decreases. As shown in FIG. 18, when the void coefficient $\alpha_g$ is approximately equal to or smaller than 0.5, the error is extremely small, and therefore, the flow rate can be calculated with high accuracy.

Practical Example 3

<Relationship Between Number n of Measurement Lines and Error e>

Next, the relationship between the number n of measurement lines and the error e was investigated.

FIG. 19 is a graph showing a relationship between the number n of measurement lines and the error e, in which a triangle indicates a void coefficient of 0 to 25% (a bubble flow), a black circle indicates a void coefficient of 25 to 75% (a slug flow), and a white circle indicates a void coefficient of 75% to 100% (an annular flow). As shown in FIG. 19, as the number n of measurement lines increases (goes to the right in the graph), the error e tends to decrease. In addition, the error e tends to be smaller when the number n of measurement lines is even than when the number is odd. This is probably because when the number n of measurement lines is even, each measurement line is directly opposed to another measurement line, so that information for determining the shape of the gas phase is more efficiently obtained. These tendencies are observed even when the void coefficient varies. Therefore, in calculation of the void coefficient $\alpha_g$, the number n of measurement lines is preferably even and as large as possible.

Practical Example 4

<Relationship Between Flow Rate Determined by Numerical Analysis and Flow Rate Determined in Practical Example of Invention>

Then, an average flow rate Q determined by numerical analysis and a flow rate $Q_{act}$ calculated in the practical example 4 were compared. In FIG. 20, the ordinate indicates the average flow rate Q, and the abscissa indicates the $Q_{act}$ calculated in this practical example. As shown in FIG. 20, the error of the calculated flow rate $Q_{act}$ with respect to the average flow rate Q was only about 5%.

Therefore, in view of the fact that conventional flowmeters have an error of the order of several percents even in measurement of the flow rate of a single-phase flow, the ultrasonic multiphase flowmeter 1 according to the present invention is highly accurate and useful.

Practical Example 5

<Measurement of Interface Position in Multiphase Flow>

Then, the flow rate of a multiphase flow in a pipe was actually measured using the ultrasonic multiphase flowmeter 1 according to this embodiment. The multiphase flow used was a two-phase flow of oil and air. In this practical example 5, a transparent acrylic circular pipe P was installed in a horizontal position, and air was intermittently introduced into oil. One ultrasonic transducer 21 below the circular pipe P was used to measure the reflected wave of the ultrasonic wave. The flow velocity distribution was calculated from the reflected wave data, and the interface position was determined by a difference operation arbitrarily selected from among a plurality of filter functions. The filter functions used in the practical example 5 were the spatial first-order one-sided difference, the spatial second-order central difference, the normal Sobel difference, the enhanced Sobel difference, the surface average difference, the two-dimensional Laplacian difference, the spatial Laplacian difference, the spatiotemporal Laplacian difference, the enhanced spatiotemporal Laplacian difference, and the frog spatiotemporal Laplacian difference.

In the following, a flow velocity distribution obtained with the ultrasonic transducer 21 and results of difference operations according to the filter functions will be described in detail with reference to the drawings. In each drawing described below, the abscissa indicates the temporal direction, and the ordinate indicates the spatial direction.

FIG. 21 is a spatiotemporal diagram showing a flow velocity distribution calculated from the reflected wave data, in which the gray scale indicates the magnitude of the flow velocity. Colors closer to white indicate higher flow velocities, and colors closer to black indicate lower flow velocities. As shown in FIG. 21, the color gradation is observed over the entire diagram, and the interface position cannot be determined from this drawing.

Thus, difference operations were used to determine the interface position. In the two-phase flow of oil and air, the air phase is formed above the oil phase because air has a smaller specific gravity than oil, so that the interface position lies in an upper part of the flow velocity distribution data shown in FIG. 21. Therefore, in the practical example 5, difference operations were performed for the upper part of the flow velocity distribution data shown in FIG. 21.

FIG. 22 includes spatiotemporal diagrams showing an interface position determined using a filter function based on the spatial first-order one-sided difference. FIG. 22(a) is a spatiotemporal diagram showing maximum/minimum values g at predetermined points determined by a filter function based on the spatial first-order one-sided difference, in which colors closer to white indicate larger maximum/minimum values g, and colors closer to black indicate smaller maximum/minimum values g. FIG. 22(b) is a spatiotemporal diagram showing the flow velocity distribution in which the white area represents the air phase over the interface position that is determined by selecting points at which the maximum/minimum value g is equal to or larger than a threshold.

Similarly, FIG. 23 includes spatiotemporal diagrams showing an interface position determined using a filter function based on the spatial second-order central difference. FIG. 23(a) is a spatiotemporal diagram showing maximum/minimum values g determined by a filter function based on the spatial second-order central difference, and FIG. 23(b) is a spatiotemporal diagram showing the flow velocity distribution in which the white area represents the air phase over the interface position that is determined based on the maximum/minimum values g.

FIG. 24 includes spatiotemporal diagrams showing an interface position determined using a filter function based on the normal Sobel difference. FIG. 24(a) is a spatiotemporal diagram showing maximum/minimum values g determined by a filter function based on the normal Sobel difference, and FIG. 24(b) is a spatiotemporal diagram showing the flow velocity distribution in which the white area represents the air phase over the interface position that is determined based on the maximum/minimum values g.

FIG. 25 includes spatiotemporal diagrams showing an interface position determined using a filter function based on the enhanced Sobel difference. FIG. 25(a) is a spatiotemporal diagram showing maximum/minimum values g determined by a filter function based on the enhanced Sobel difference, and FIG. 25(b) is a spatiotemporal diagram showing the flow velocity distribution in which the white area represents the air phase over the interface position that is determined based on the maximum/minimum values g.

FIG. 26 includes spatiotemporal diagrams showing an interface position determined using a filter function based on the surface average difference. FIG. 26(a) is a spatiotemporal diagram showing maximum/minimum values g determined by a filter function based on the surface average difference, and FIG. 26(b) is a spatiotemporal diagram showing the flow velocity distribution in which the white area represents the air phase over the interface position that is determined based on the maximum/minimum values g. The surface average difference was performed for all the data on the spatiotemporal flow velocity distribution.

FIG. 27 includes spatiotemporal diagrams showing an interface position determined using a filter function based on the two-dimensional Laplacian difference. FIG. 27(a) is a spatiotemporal diagram showing maximum/minimum values g determined by a filter function based on the two-dimensional Laplacian difference, and FIG. 27(b) is a spatiotemporal diagram showing the flow velocity distribution in which the white area represents the air phase over the interface position that is determined based on the maximum/minimum values g.

FIG. 28 includes spatiotemporal diagrams showing an interface position determined using a filter function based on the spatial Laplacian difference. FIG. 28(a) is a spatiotemporal diagram showing maximum/minimum values g determined by a filter function based on the two-dimensional Laplacian difference, and FIG. 28(b) is a spatiotemporal diagram showing the flow velocity distribution in which the white area represents the air phase over the interface position that is determined based on the maximum/minimum values g.

FIG. 29 includes spatiotemporal diagrams showing an interface position determined using a filter function based on the spatiotemporal Laplacian difference. FIG. 29(a) is a spatiotemporal diagram showing maximum/minimum values g determined by a filter function based on the spatiotemporal Laplacian difference, and FIG. 29(b) is a spatiotemporal diagram showing the flow velocity distribution in which the white area represents the air phase over the interface position that is determined based on the maximum/minimum values g.

FIG. 30 includes spatiotemporal diagrams showing an interface position determined using a filter function based on the enhanced spatiotemporal Laplacian difference. FIG. 30(a) is a spatiotemporal diagram showing maximum/minimum values g determined by a filter function based on the enhanced spatiotemporal Laplacian difference, and FIG. 30(b) is a spatiotemporal diagram showing the flow velocity distribution in which the white area represents the air phase over the interface position that is determined based on the maximum/minimum values g.

FIG. 31 includes spatiotemporal diagrams showing an interface position determined using a filter function based on the frog spatiotemporal Laplacian difference. FIG. 31(a) is a spatiotemporal diagram showing maximum/minimum values g determined by a filter function based on the frog spatiotemporal Laplacian difference, and FIG. 31(b) is a spatiotemporal diagram showing the flow velocity distribution in which the white area represents the air phase over the interface position that is determined based on the maximum/minimum values g.

As is apparent from the above description, the interface can be detected with any of the filter functions based on the difference operations.

Practical Example 6

<Relationship Between Actual Interface Position and Interface Position Determined in Practical Example of Invention>

In the practical example 6, the accuracy of the interface position determined using the normal Sobel difference in the practical example 5 with respect to the actual interface position was evaluated. FIG. 32 is a graph showing the interface positions and a temporal change thereof. As is apparent from FIG. 32, the interface positions approximately agreed with each other. The error of the interface position determined using the normal Sobel difference from the actual interface position was 5% or less of the diameter 2R of the circular pipe. Therefore, the practical example 6 shows that the flow rate of the liquid phase can be calculated as accurately as the flow rate of a single-phase flow, and the error can be reduced to 5% or less.

FIG. 33 shows an example of a graphical interface displayed on the display means 3 in this example. In FIG. 33, the data shown in the upper left area indicates the result of operation or obtainment by the interface position determining means 8, the data shown in the lower left area indicates the determined interface position, the data shown in the upper right area indicates the determined interface position and the flow velocity distribution, and the gauge shown in the lower right area indicates the flow rate. All the information is displayed in real time.

The ultrasonic multiphase flowmeter 1, the ultrasonic multiphase flow rate measurement program 1a, and the multiphase flow rate measurement method using an ultrasonic wave according to the present invention are not limited to the embodiment described above but can be appropriately modified.

For example, selection from among the operation sections and the obtaining sections of the interface position determining means 8 may be automatically performed based on the flow velocity distribution and the reflected wave data.

BRIEF DESCRIPTION OF THE DRAWINGS

FIG. 6 is a diagram showing a matrix of a filter function based on a spatial first-order one-sided difference used for a difference operation according to the embodiment;

FIG. 7 is a diagram showing a matrix of a filter function based on a spatial second-order central difference used for the difference operation according to the embodiment;

FIG. 8 is a diagram showing a matrix of a filter function based on a normal Sobel difference (a temporally diffused spatially gradient difference) used for the difference operation according to the embodiment;

FIG. 9 is a diagram showing a matrix of a filter function based on an enhanced Sobel difference (a temporally highly diffused spatially gradient difference) used for the difference operation according to the embodiment;

FIG. 10 is a diagram showing a matrix of a filter function based on a surface average difference (a spatiotemporally averaged difference) used for the difference operation according to the embodiment;

FIG. 11 is a diagram showing a matrix of a filter function based on a two-dimensional Laplacian difference used for the difference operation according to the embodiment;

FIG. 12 is a diagram showing a matrix of a filter function based on a spatial Laplacian difference used for the difference operation according to the embodiment;

FIG. 13 is a diagram showing a matrix of a filter function based on a spatiotemporal Laplacian difference (a temporally diffused spatial Laplacian difference) used for the difference operation according to the embodiment;

FIG. 14 is a diagram showing a matrix of a filter function based on an enhanced spatiotemporal Laplacian difference used for the difference operation according to the embodiment;

FIG. 22(*b*) is a spatiotemporal diagram showing a flow velocity distribution in the practical example, in which the white area represents an air phase over an interface position that is determined based on the maximum/minimum values g;

FIG. 23(*b*) is a spatiotemporal diagram showing a flow velocity distribution in the practical example, in which the white area represents an air phase over an interface position that is determined based on the maximum/minimum values g;

FIG. 24(*b*) is a spatiotemporal diagram showing a flow velocity distribution in the practical example, in which the white area represents an air phase over an interface position that is determined based on the maximum/minimum values g;

FIG. 25(*b*) is a spatiotemporal diagram showing a flow velocity distribution in the practical example, in which the white area represents an air phase over an interface position that is determined based on the maximum/minimum values g;

FIG. 26(*b*) is a spatiotemporal diagram showing a flow velocity distribution in the practical example, in which the white area represents an air phase over an interface position that is determined based on the maximum/minimum values g;

FIG. 27(*b*) is a spatiotemporal diagram showing a flow velocity distribution in the practical example, in which the white area represents an air phase over an interface position that is determined based on the maximum/minimum values g;

FIG. 28(*b*) is a spatiotemporal diagram showing a flow velocity distribution in the practical example, in which the white area represents an air phase over an interface position that is determined based on the maximum/minimum values g;

FIG. 29(b) is a spatiotemporal diagram showing a flow velocity distribution in the practical example, in which the white area represents an air phase over an interface position that is determined based on the maximum/minimum values g;

Figure 1:
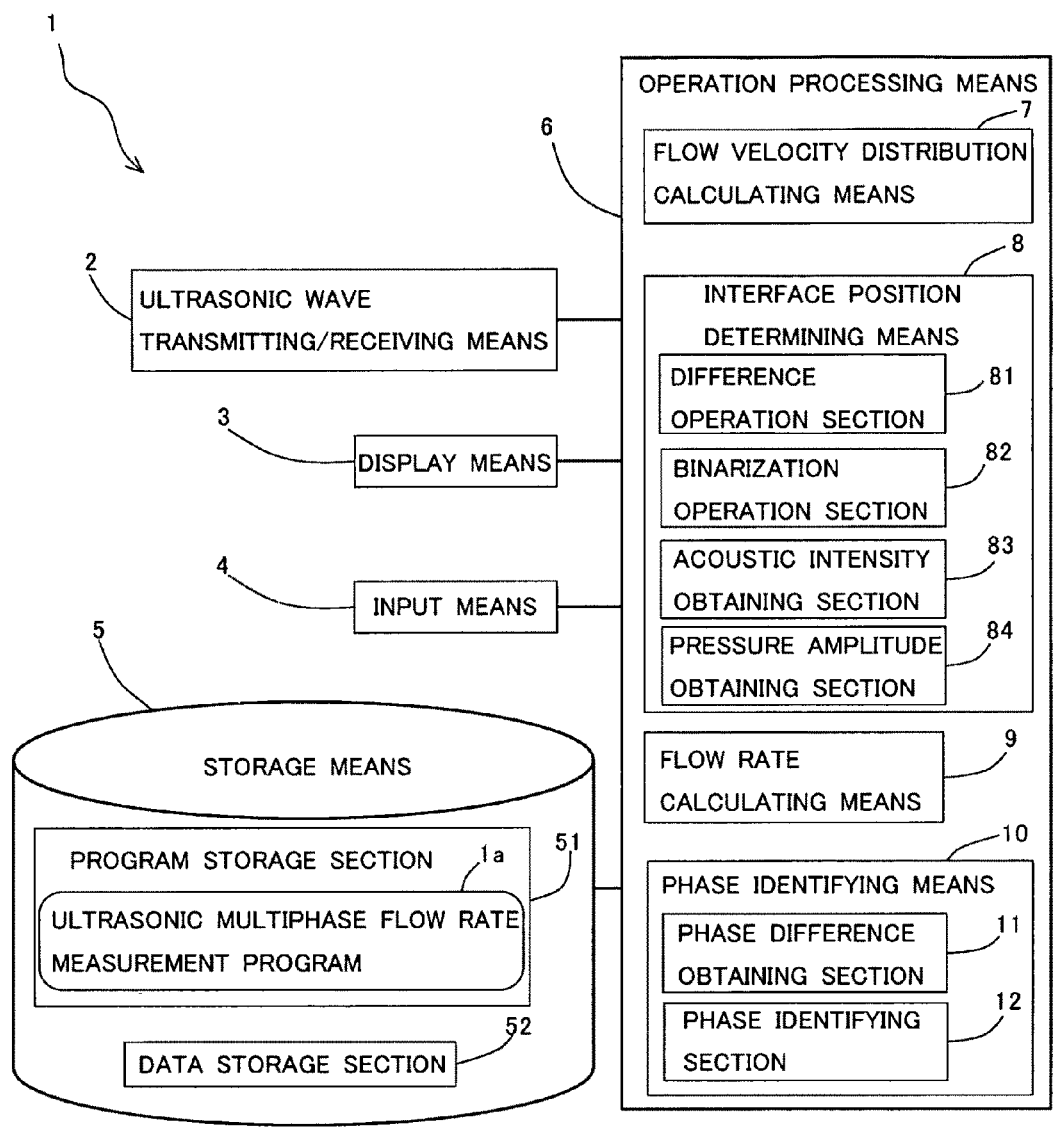
FIG. 1 is a block diagram showing an ultrasonic multiphase flowmeter and an ultrasonic multiphase flow rate measurement program according to an embodiment of the present invention.
Figure 2:
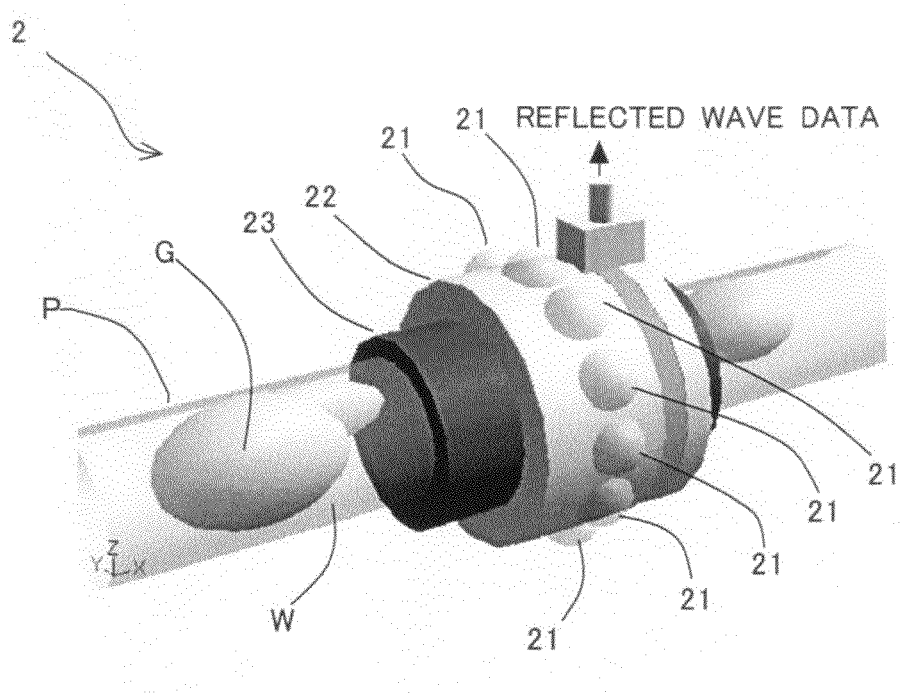
FIG. 2 is a perspective view of ultrasonic wave transmitting/receiving means in use according to the embodiment.
Figure 3:
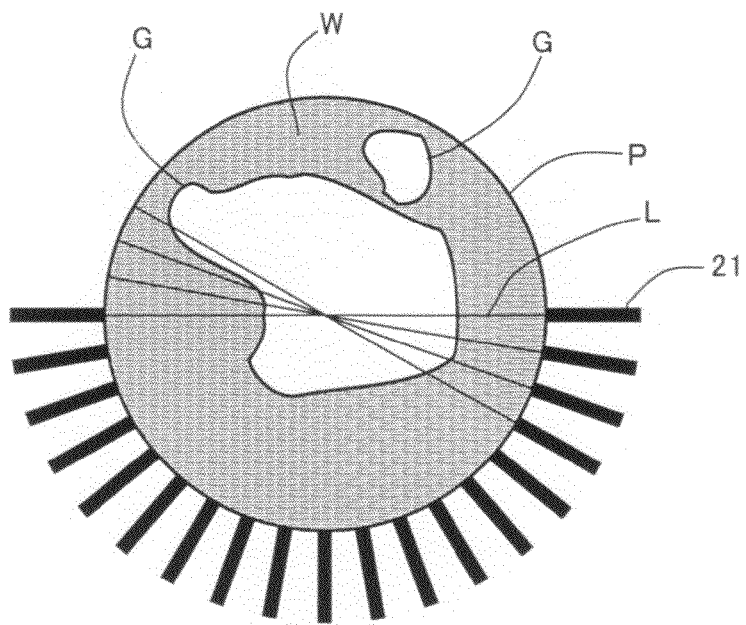
FIG. 3 is a cross-sectional view of a circular pipe showing a multiphase flow in the circular pipe and an arrangement of ultrasonic transducers according to the embodiment.
Figure 4:
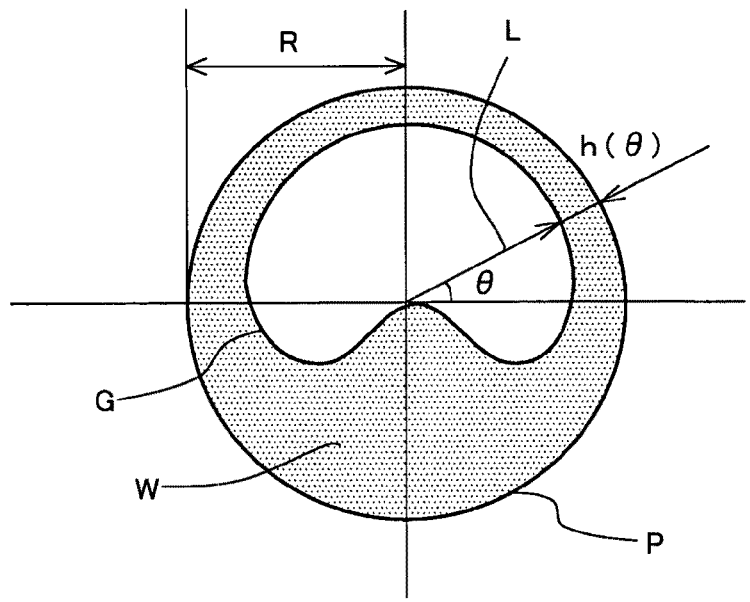
FIG. 4 is a schematic cross-sectional view of the circular pipe used for calculation of a void coefficient according to the embodiment.
Figure 5:
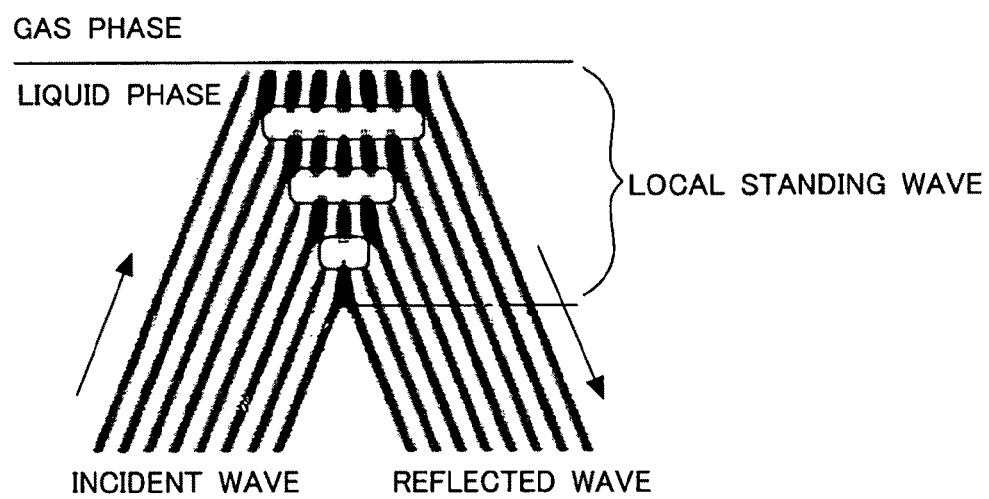
FIG. 5 is a schematic diagram showing a local standing wave caused by interference between an incident wave and a reflected wave at an interface.
Figures 15, 16:
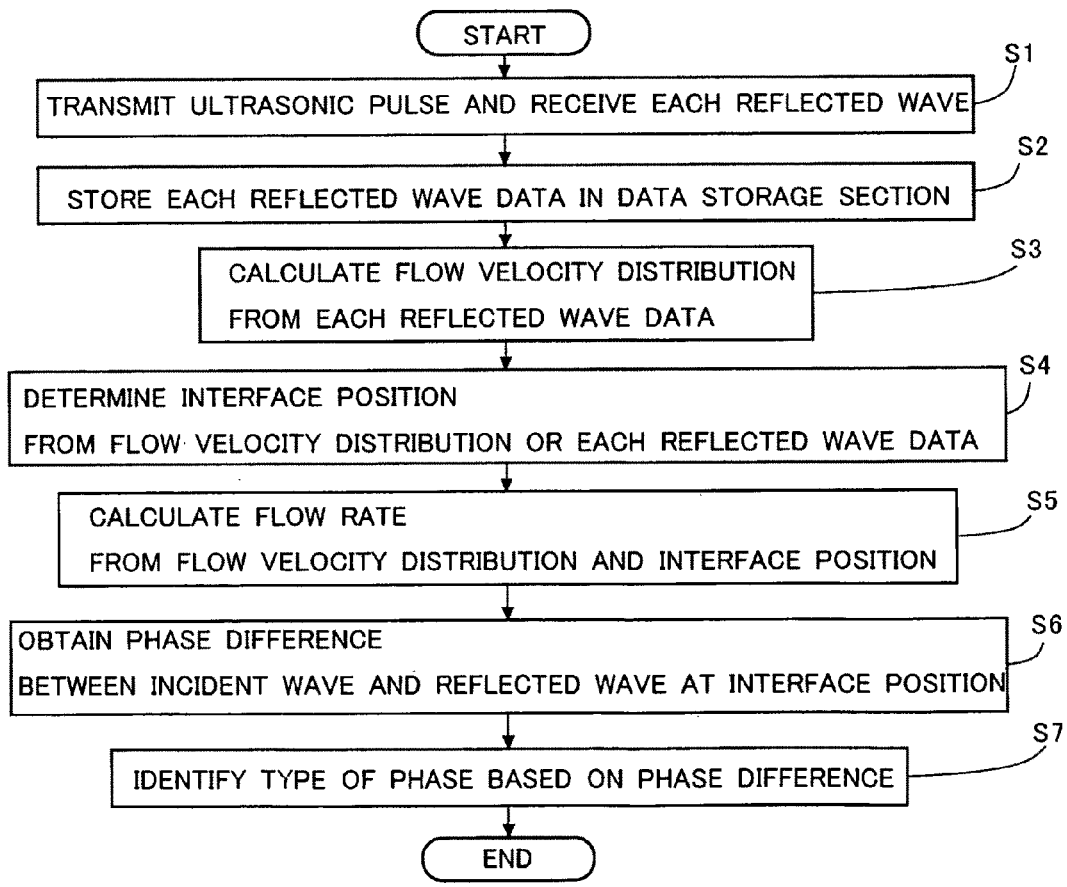
FIG. 15 is a diagram showing a matrix of a filter function based on a frog spatiotemporal Laplacian difference used for the difference operation according to the embodiment.
FIG. 16 is a flow chart showing a measurement procedure of a multiphase flow rate measurement method using an ultrasonic wave according to the present invention.
Figure 17:
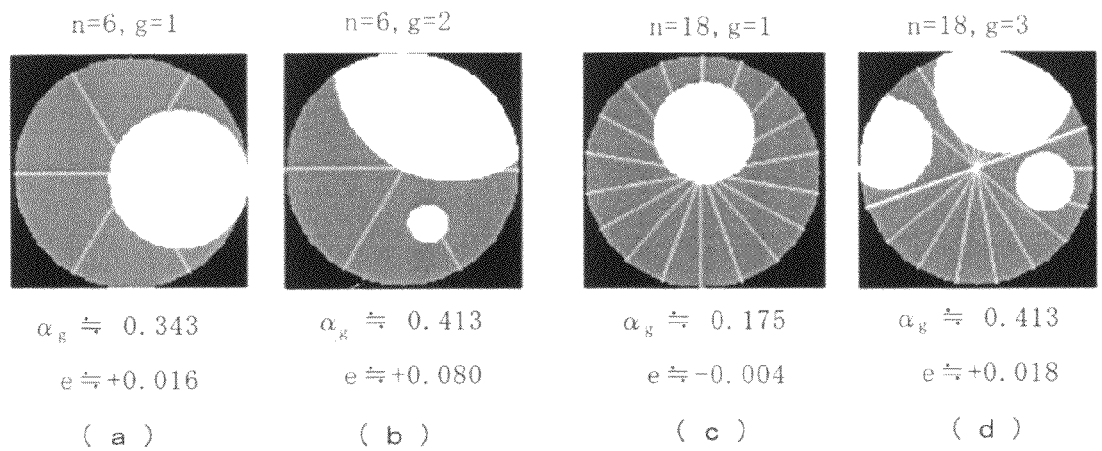
FIG. 17 includes circular-pipe cross-sectional model diagrams showing a liquid phase and a gas phase in a circular pipe at a predetermined time calculated by numerical analysis and a calculated void coefficient in a practical example.
Figure 18:
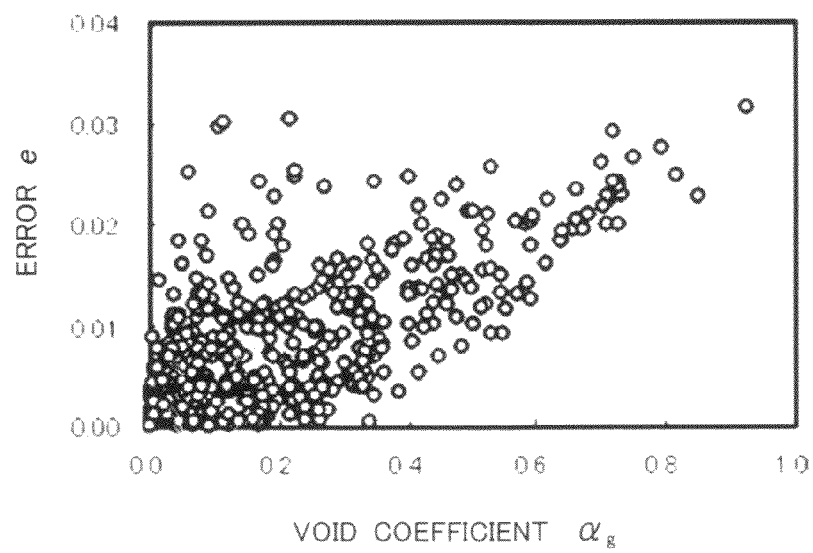
FIG. 18 is a graph showing the error of the calculated void coefficient with respect to the accurate void coefficient in a practical example.
Figure 19:
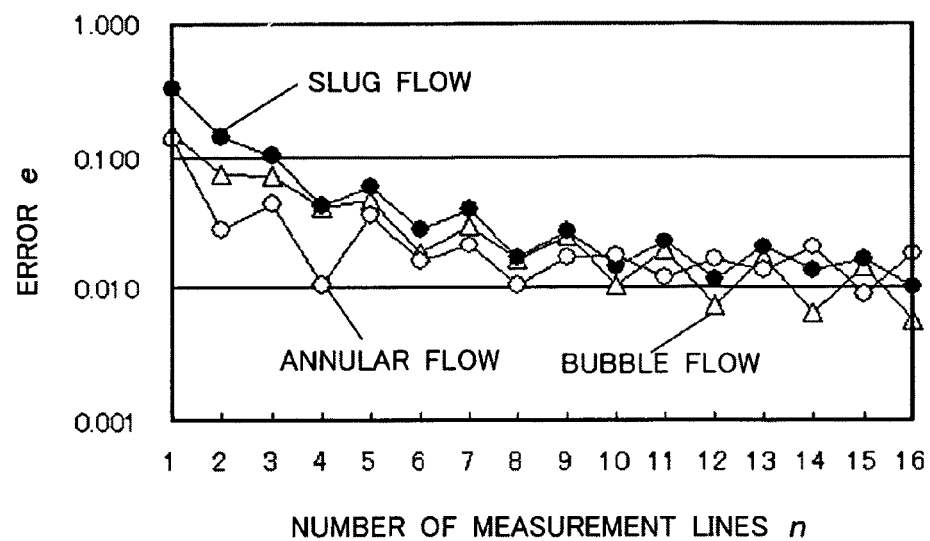
FIG. 19 is a graph showing a relationship between the number of measurement lines and the error of the void coefficient.
Figure 20:
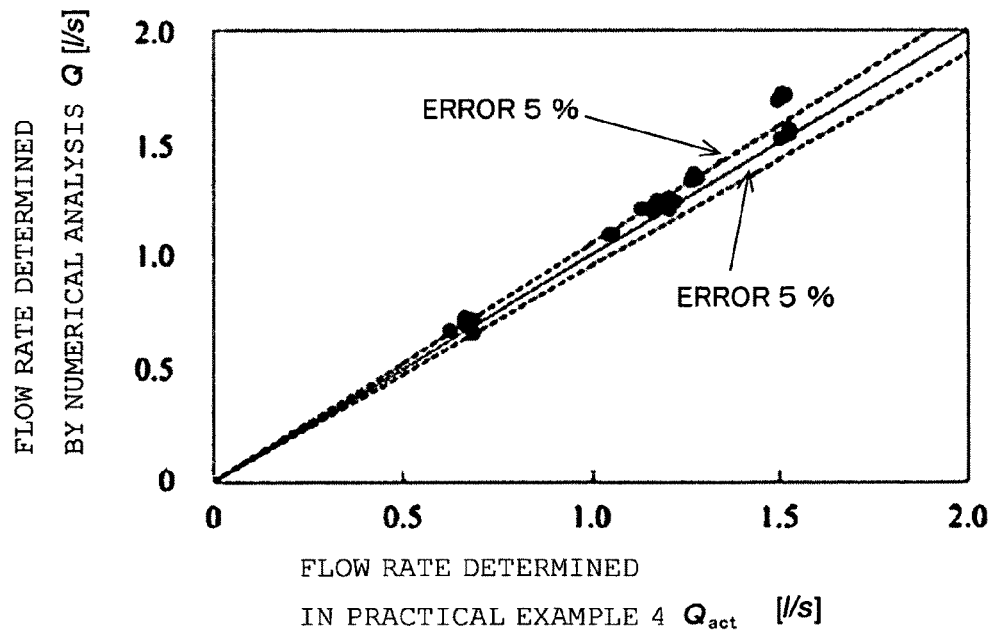
FIG. 20 is a graph showing the flow rate calculated in a practical example and the accurate flow rate for comparison.
Figure 21:
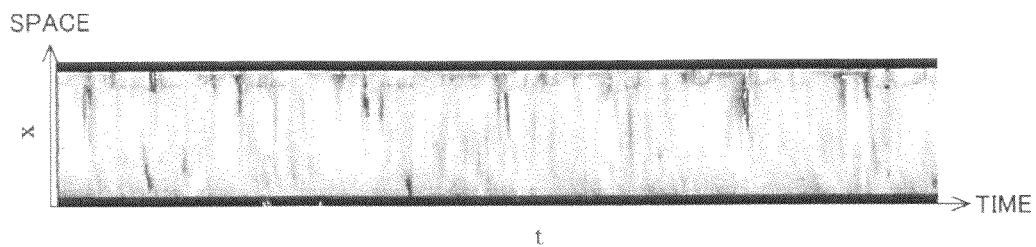
FIG. 21 is a spatiotemporal diagram showing a calculated flow velocity distribution in a practical example.
Figure 22:
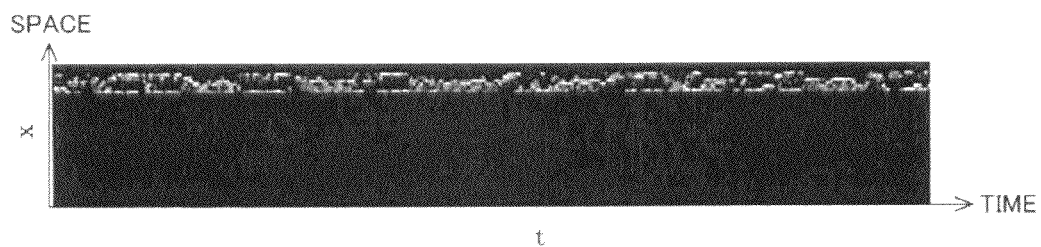
FIG. 22(*a*) is a spatiotemporal diagram showing maximum/minimum values g determined by a filter function based on a spatial first-order one-sided difference in the practical example.
Figure 22:
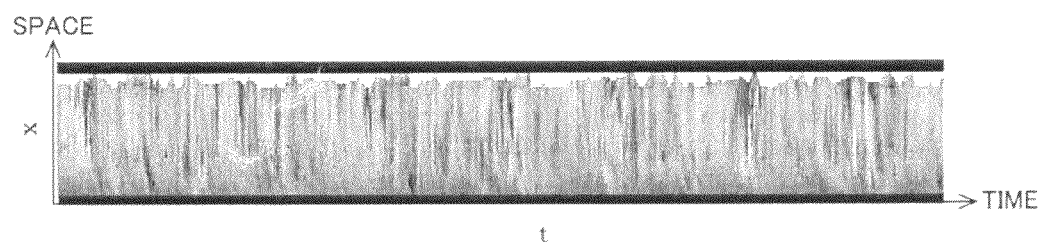
Figure 23:
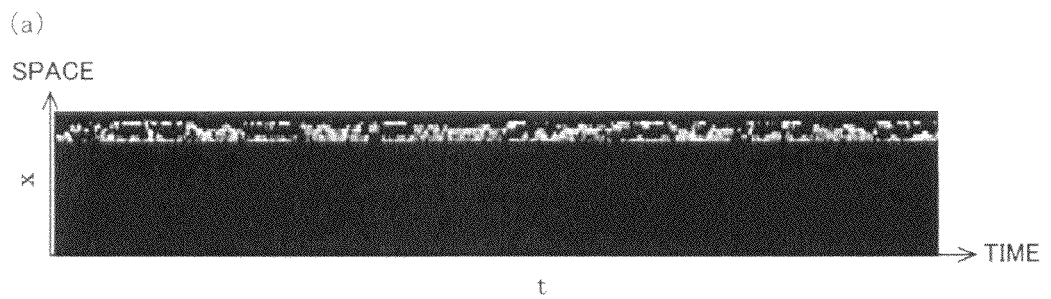
FIG. 23(*a*) is a spatiotemporal diagram showing maximum/minimum values g determined by a filter function based on the spatial second-order central difference in the practical example.
Figure 23:
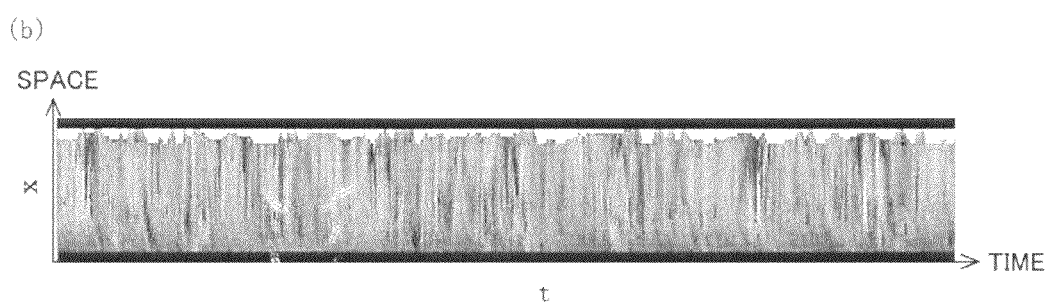
Figure 24:
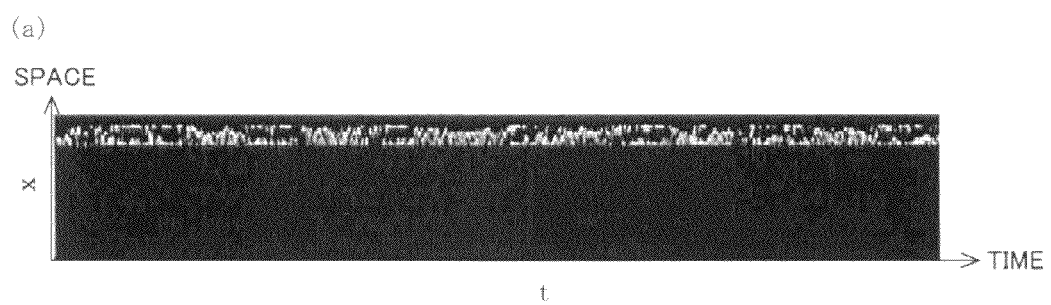
FIG. 24(*a*) is a spatiotemporal diagram showing maximum/minimum values g determined by a filter function based on the normal Sobel difference in the practical example.
Figure 24:
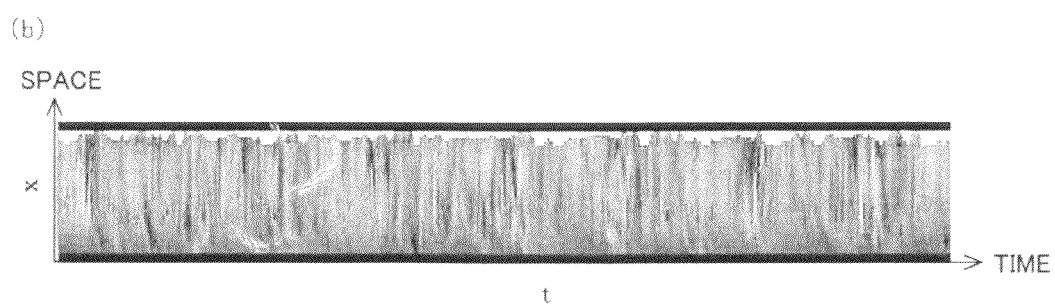
Figure 25:
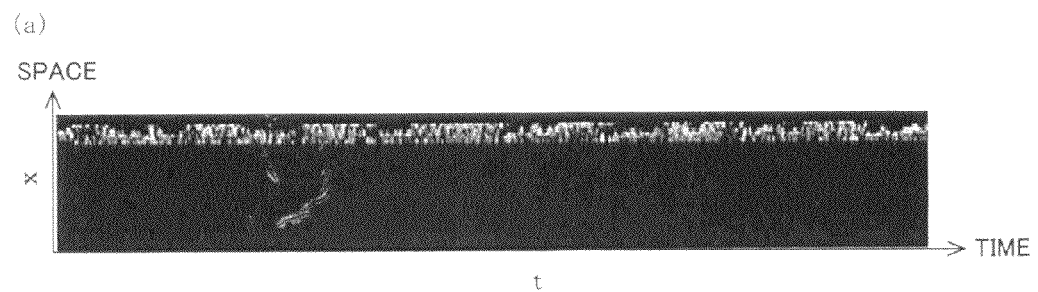
FIG. 25(*a*) is a spatiotemporal diagram showing maximum/minimum values g determined by a filter function based on the enhanced Sobel difference in the practical example.
Figure 25:
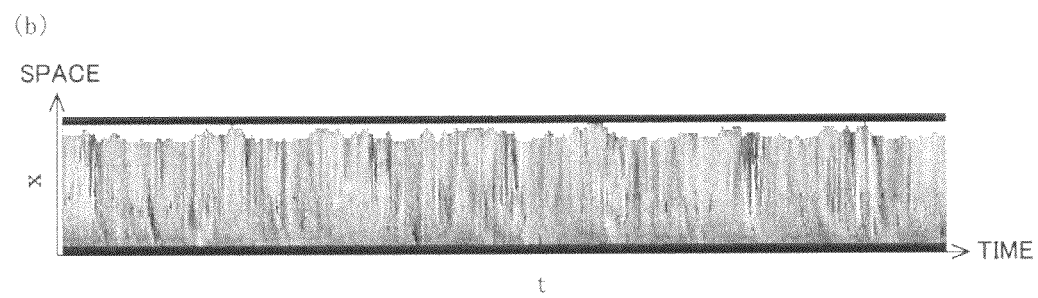
Figure 26:
FIG. 26(*a*) is a spatiotemporal diagram showing maximum/minimum values g determined by a filter function based on the surface average difference in the practical example.
Figure 26:
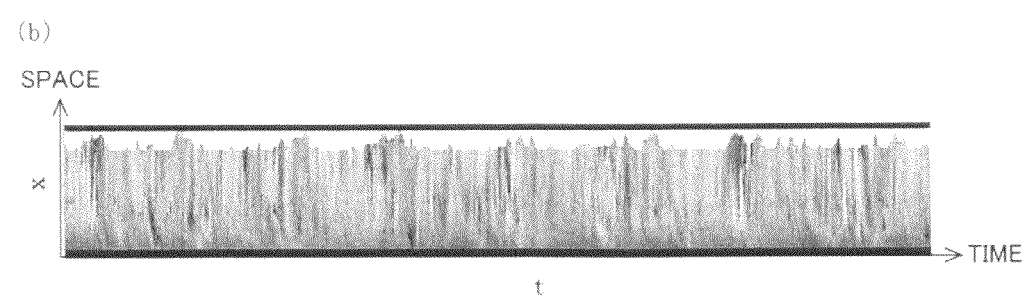
Figure 27:
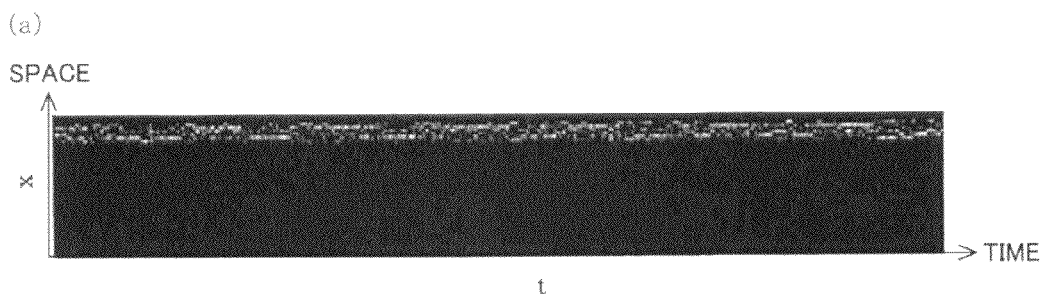
FIG. 27(*a*) is a spatiotemporal diagram showing maximum/minimum values g determined by a filter function based on the two-dimensional Laplacian difference in the practical example.
Figure 27:
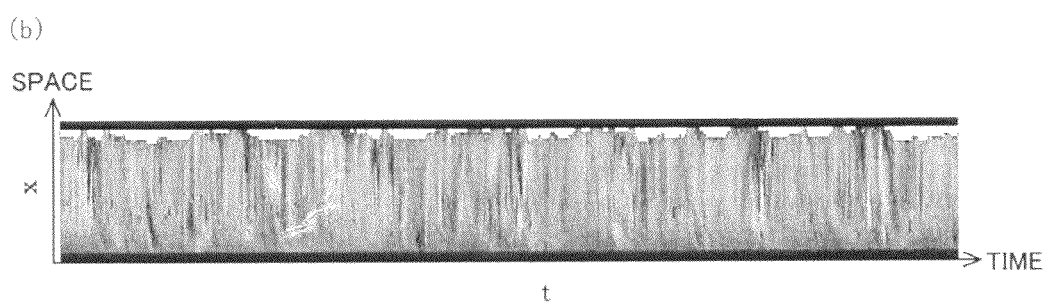
Figure 28:
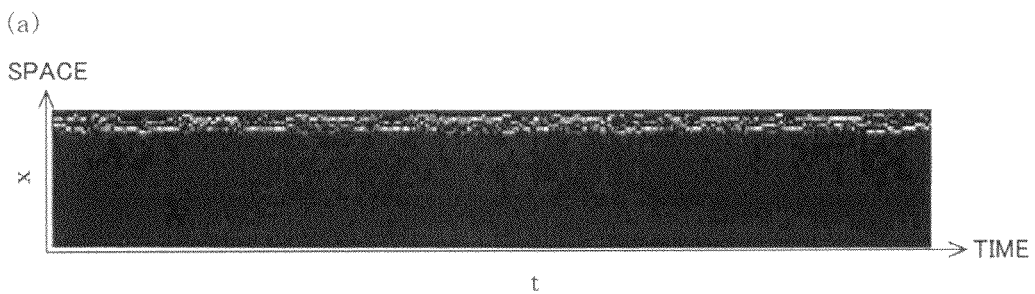
FIG. 28(*a*) is a spatiotemporal diagram showing maximum/minimum values g determined by a filter function based on the spatial Laplacian difference in the practical example.
Figure 28:
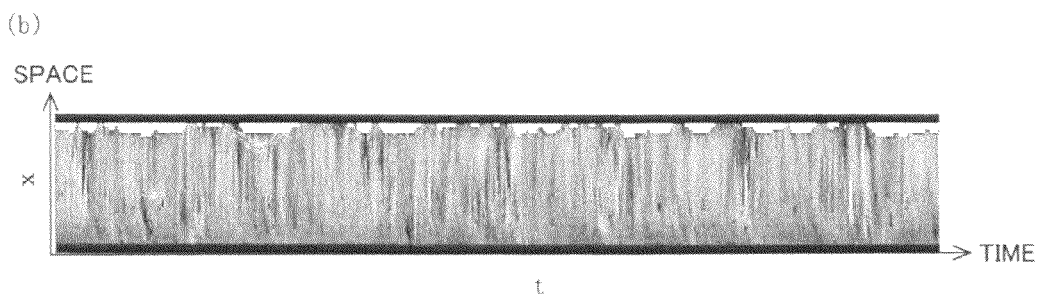
Figure 29:
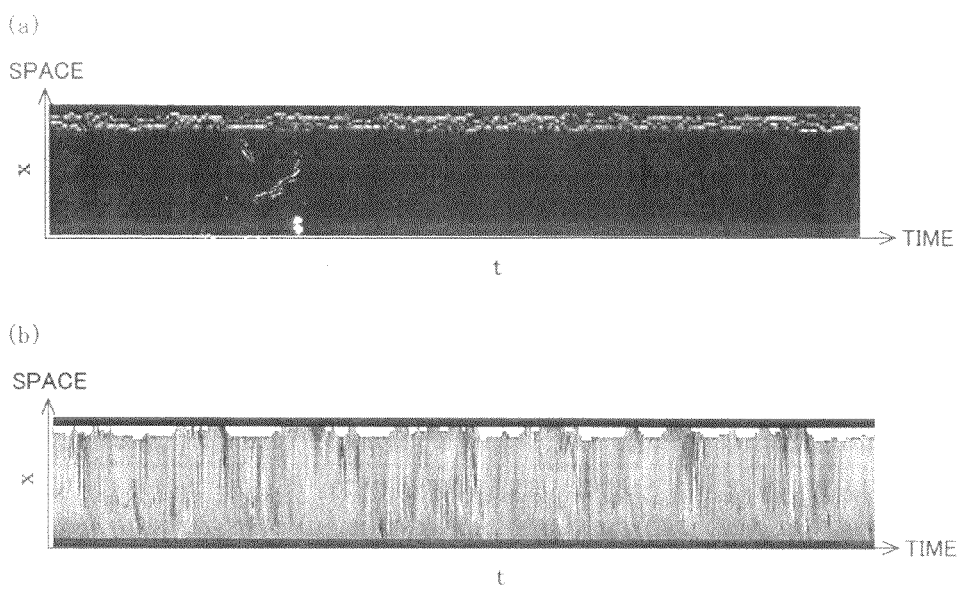
FIG. 29(*a*) is a spatiotemporal diagram showing maximum/minimum values g determined by a filter function based on the spatiotemporal Laplacian difference in the practical example.
Figure 30:
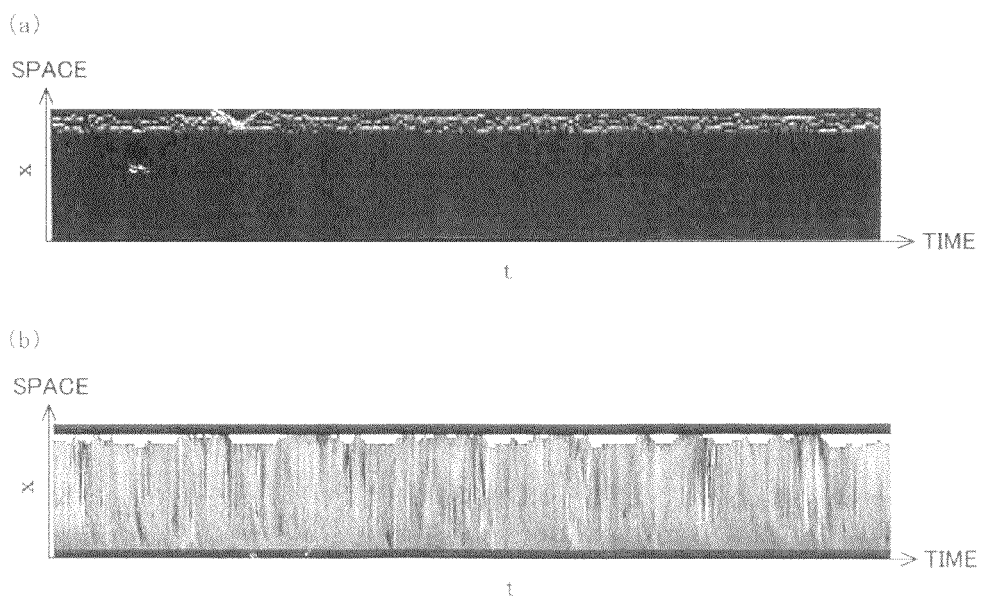
FIG. 30(a) is a spatiotemporal diagram showing maximum/minimum values g determined by a filter function based on the enhanced spatiotemporal Laplacian difference in the practical example.
FIG. 30(b) is a spatiotemporal diagram showing a flow velocity distribution in the practical example, in which the white area represents an air phase over an interface position that is determined based on the maximum/minimum values g.
Figure 31:
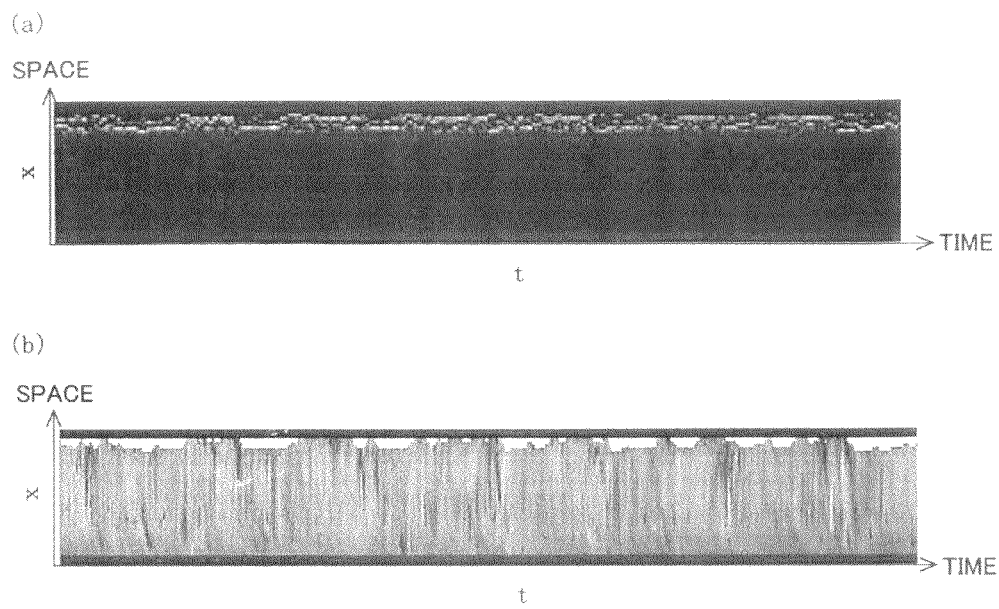
FIG. 31(a) is a spatiotemporal diagram showing maximum/minimum values g determined by a filter function based on the frog spatiotemporal Laplacian difference in the practical example.
FIG. 31(b) is a spatiotemporal diagram showing a flow velocity distribution in the practical example, in which the white area represents an air phase over an interface position that is determined based on the maximum/minimum values g.
Figure 32:
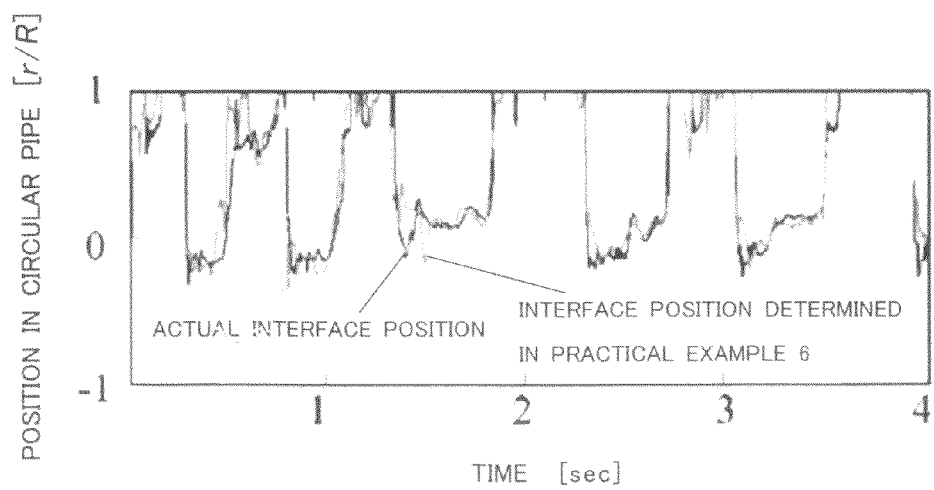
FIG. 32 is a graph showing an interface position determined in a practical example and the actual interface position and a temporal change thereof.
Figure 33:
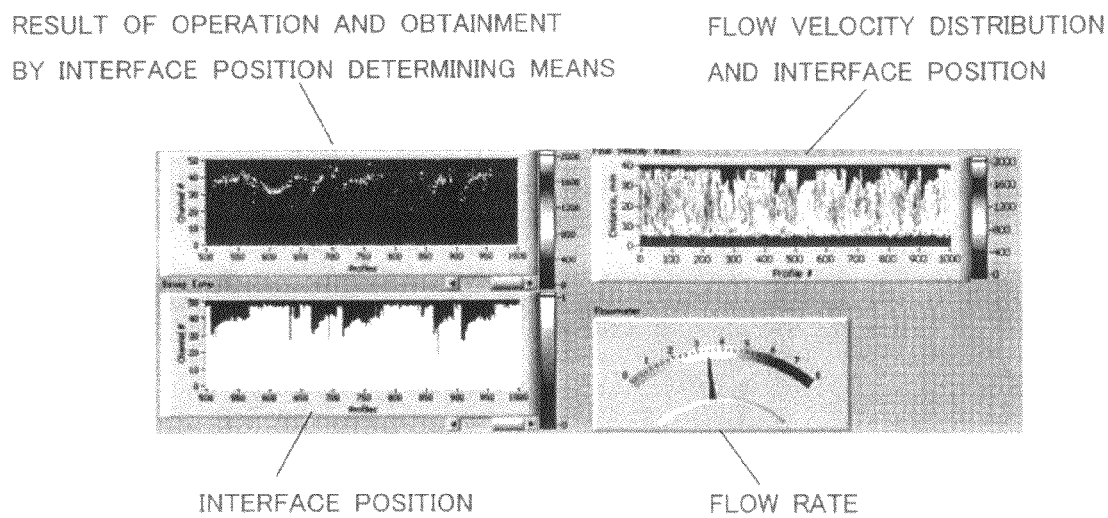
FIG. 33 shows a graphical interface displayed on display means in the practical example.

| Description of Symbols | |
|---|---|
| 1 | ultrasonic multiphase flowmeter |
| 1a | ultrasonic multiphase flow rate measurement program |
| 2 | ultrasonic wave transmitting/receiving means |
| 21 | ultrasonic transducer |
| 22 | transducer holder |
| 23 | reverberation ultrasonic wave absorbing sheet |
| 3 | display means |
| 4 | input means |
| 5 | storage means |
| 51 | program storage section |
| 52 | data storage section |
| 6 | operation processing means |
| 7 | flow velocity distribution calculating means |
| 8 | interface position determining means |
| 81 | difference operation section |
| 82 | binarization operation section |
| 83 | acoustic intensity obtaining section |
| 84 | pressure amplitude obtaining section |
| 9 | flow rate calculating means |
| 10 | phase identifying means |
| 11 | phase difference obtaining section |
| 12 | phase identifying section |
| P | circular pipe |
| G | gas phase |
| W | liquid phase |
| L | measurement line |
| R | radius of circular pipe P |

The invention claimed is:

1. An ultrasonic multiphase flowmeter, comprising:

a plurality of ultrasonic wave transmitting/receiving means that are disposed on a periphery of a pipe in which a multiphase flow containing a reflector flows, transmit an ultrasonic wave into said multiphase flow and receive at least a reflected wave from said reflector and a reflected wave from an interface in said multiphase flow;

flow velocity distribution calculating means that calculates a spatiotemporal flow velocity distribution for a plurality of positions in the direction of transmission of said ultrasonic wave that is substantially continuous in the temporal direction based on data on each reflected wave received by said ultrasonic wave transmitting/receiving means;

interface position determining means that has at least any of a difference operation section that performs at least any of a spatial difference operation for a flow velocity distribution at a predetermined time in said spatiotemporal flow velocity distribution and a temporal difference operation for a flow velocity distribution at a predetermined position in said spatiotemporal flow velocity distribution and a binarization operation section that performs a binarization operation to determine whether each flow velocity in said spatiotemporal flow velocity distribution is equal to or lower than a predetermined threshold or not and determines an interface position based on information on the operation; and flow rate calculating means that calculates a flow rate by integrating a part of said spatiotemporal flow velocity distribution up to the interface position determined by said interface position determining means with respect to the cross-sectional area of said pipe.

2. An ultrasonic multiphase flowmeter, comprising:

a plurality of ultrasonic wave transmitting/receiving means that are disposed on a periphery of a pipe in which a multiphase flow containing a reflector flows, transmit an ultrasonic wave into said multiphase flow and receive at least a reflected wave from said reflector and a reflected wave from an interface in said multiphase flow;

flow velocity distribution calculating means that calculates a spatiotemporal flow velocity distribution for a plurality of positions in the direction of transmission of said ultrasonic wave that is substantially continuous in the temporal direction based on data on each reflected wave received by said ultrasonic wave transmitting/receiving means;

interface position determining means that has at least any of an acoustic intensity obtaining section that obtains an acoustic intensity of each reflected wave from the data on each reflected wave received by said ultrasonic wave transmitting/receiving means and a pressure amplitude obtaining section that obtains a pressure amplitude of each reflected wave from the data on each reflected wave received by said ultrasonic wave transmitting/receiving means and determines an interface position by using the fact that the reflected wave from the interface in said multiphase flow has a higher acoustic intensity than the reflected wave from said reflector or by using the fact that the reflected wave from the interface in said multiphase flow has a larger pressure amplitude than the reflected wave from said reflector; and flow rate calculating means that calculates a flow rate by integrating a part of said spatiotemporal flow velocity distribution up to the interface position determined by said interface position determining means with respect to the cross-sectional area of said pipe.

3. An ultrasonic multiphase flowmeter, comprising:

a plurality of ultrasonic wave transmitting/receiving means that are disposed on a periphery of a pipe in which a multiphase flow containing a reflector flows, transmit an ultrasonic wave into said multiphase flow and receive at least a reflected wave from said reflector and a reflected wave from an interface in said multiphase flow;

flow velocity distribution calculating means that calculates a spatiotemporal flow velocity distribution for a plurality of positions in the direction of transmission of said ultrasonic wave that is substantially continuous in the temporal direction based on data on each reflected wave received by said ultrasonic wave transmitting/receiving means;

interface position determining means that has at least any of a difference operation section that performs at least any of a spatial difference operation for a flow velocity distribution at a predetermined time in said spatiotemporal flow velocity distribution and a temporal difference operation for a flow velocity distribution at a predetermined position in said spatiotemporal flow velocity distribution and a binarization operation section that performs a binarization operation to determine whether each flow velocity in said spatiotemporal flow velocity distribution is equal to or lower than a predetermined threshold or not and at least any of an acoustic intensity obtaining section that obtains an acoustic intensity of each reflected wave from the data on each reflected wave received by said ultrasonic wave transmitting/receiving means and a pressure amplitude obtaining section that obtains a pressure amplitude of each reflected wave from the data on each reflected wave received by said ultrasonic wave transmitting/receiving means and determines an interface position by using information on the operation and the fact that the reflected wave from the interface in said multiphase flow has a higher acoustic intensity than the reflected wave from said reflector or by using the information on the operation and the fact that the reflected wave from the interface in said multiphase flow has a larger pressure amplitude than the reflected wave from said reflector; and flow rate calculating means that calculates a flow rate by integrating a part of said spatiotemporal flow velocity distribution up to the interface position determined by said interface position determining means with respect to the cross-sectional area of said pipe.

4. The ultrasonic multiphase flowmeter according to any one of claims 1 to 3, further comprising:

phase identifying means that obtains a phase difference between an incident ultrasonic wave and a reflected ultrasonic wave at the interface position determined by said interface position determining means and identifies the type of a phase by determining whether said incident wave and said reflected wave are in anti-phase or not based on the phase difference.

5. An ultrasonic multiphase flow rate measurement program embodied on a non-transitory computer-readable medium and executed on a processor that makes a computer function as:

storage means that stores data on each reflected wave obtained by a plurality of ultrasonic wave transmitting/receiving means disposed on a periphery of a pipe in which a multiphase flow containing a reflector flows transmitting an ultrasonic wave into said multiphase flow and receiving at least a reflected wave from said reflector and a reflected wave from an interface in said multiphase flow;

flow velocity distribution calculating means that calculates a spatiotemporal flow velocity distribution for a plurality of positions in the direction of transmission of said ultrasonic wave that is substantially continuous in the temporal direction based on the data on each reflected wave stored in said storage means;

interface position determining means that has at least any of a difference operation section that performs at least any of a spatial difference operation for a flow velocity distribution at a predetermined time in said spatiotemporal flow velocity distribution and a temporal difference operation for a flow velocity distribution at a predetermined position in said spatiotemporal flow velocity distribution and a binarization operation section that performs a binarization operation to determine whether each flow velocity in said spatiotemporal flow velocity distribution is equal to or lower than a predetermined threshold or not and determines an interface position based on information on the operation; and flow rate calculating means that calculates a flow rate by integrating a part of said spatiotemporal flow velocity distribution up to the interface position determined by said interface position determining means with respect to the cross-sectional area of said pipe.

6. An ultrasonic multiphase flow rate measurement program embodied on a non-transitory computer-readable medium and executed on a processor that makes a computer function as:

storage means that stores data on each reflected wave obtained by a plurality of ultrasonic wave transmitting/receiving means disposed on a periphery of a pipe in which a multiphase flow containing a reflector flows transmitting an ultrasonic wave into said multiphase flow and receiving at least a reflected wave from said reflector and a reflected wave from an interface in said multiphase flow;

flow velocity distribution calculating means that calculates a spatiotemporal flow velocity distribution for a plurality of positions in the direction of transmission of said ultrasonic wave that is substantially continuous in the temporal direction based on the data on each reflected wave stored in said storage means;

interface position determining means that has at least any of an acoustic intensity obtaining section that obtains an acoustic intensity of each reflected wave from the data on each reflected wave received by said ultrasonic wave transmitting/receiving means and a pressure amplitude obtaining section that obtains a pressure amplitude of each reflected wave from the data on each reflected wave received by said ultrasonic wave transmitting/receiving means and determines an interface position by using the fact that the reflected wave from the interface in said multiphase flow has a higher acoustic intensity than the reflected wave from said reflector or by using the fact that the reflected wave from the interface in said multiphase flow has a larger pressure amplitude than the reflected wave from said reflector; and flow rate calculating means that calculates a flow rate by integrating a part of said spatiotemporal flow velocity distribution up to the interface position determined by said interface position determining means with respect to the cross-sectional area of said pipe.

7. An ultrasonic multiphase flow rate measurement program embodied on a non-transitory computer-readable medium and executed on a processor that makes a computer function as:

storage means that stores data on each reflected wave obtained by a plurality of ultrasonic wave transmitting/receiving means disposed on a periphery of a pipe in which a multiphase flow containing a reflector flows transmitting an ultrasonic wave into said multiphase flow and receiving at least a reflected wave from said reflector and a reflected wave from an interface in said multiphase flow;

flow velocity distribution calculating means that calculates a spatiotemporal flow velocity distribution for a plurality of positions in the direction of transmission of said ultrasonic wave that is substantially continuous in the temporal direction based on the data on each reflected wave stored in said storage means;

interface position determining means that has at least any of a difference operation section that performs at least any of a spatial difference operation for a flow velocity distribution at a predetermined time in said spatiotemporal flow velocity distribution and a temporal difference operation for a flow velocity distribution at a predetermined position in said spatiotemporal flow velocity distribution and a binarization operation section that performs a binarization operation to determine whether each flow velocity in said spatiotemporal flow velocity distribution is equal to or lower than a predetermined threshold or not and at least any of an acoustic intensity obtaining section that obtains an acoustic intensity of each reflected wave from the data on each reflected wave received by said ultrasonic wave transmitting/receiving means and a pressure amplitude obtaining section that obtains a pressure amplitude of each reflected wave from the data on each reflected wave received by said ultrasonic wave transmitting/receiving means and determines an interface position by using information on the operation and the fact that the reflected wave from the interface in said multiphase flow has a higher acoustic intensity than the reflected wave from said reflector or by using the information on the operation and the fact that the reflected wave from the interface in said multiphase flow has a larger pressure amplitude than the reflected wave from said reflector; and flow rate calculating means that calculates a flow rate by integrating a part of said spatiotemporal flow velocity distribution up to the interface position determined by said interface position determining means with respect to the cross-sectional area of said pipe.

8. The ultrasonic multiphase flow rate measurement program according to any one of claims 5 to 7, the ultrasonic multiphase flow rate measurement program makes the computer further function as:

phase identifying means that obtains a phase difference between an incident ultrasonic wave and a reflected ultrasonic wave at the interface position determined by said interface position determining means and identifies the type of a phase by determining whether said incident wave and said reflected wave are in anti-phase or not based on the phase difference.

9. A multiphase flow rate measuring method using an ultrasonic wave embodied on a non-transitory computer-readable medium and executed on a processor, comprising:

an ultrasonic wave transmitting/receiving step of a plurality of ultrasonic wave transmitting/receiving means disposed on a periphery of a pipe in which a multiphase flow containing a reflector flows transmitting an ultrasonic wave into said multiphase flow and receiving at least a reflected wave from said reflector and a reflected wave from an interface in said multiphase flow;

a flow velocity distribution calculating step of calculating a spatiotemporal flow velocity distribution for a plurality of positions in the direction of transmission of said ultrasonic wave that is substantially continuous in the temporal direction based on data on each reflected wave received by said ultrasonic wave transmitting/receiving means;

an interface position determining step of performing at least any of at least any of a spatial difference operation for a flow velocity distribution at a predetermined time in said spatiotemporal flow velocity distribution and a temporal difference operation for a flow velocity distribution at a predetermined position in said spatiotemporal flow velocity distribution and a binarization operation to determine whether each flow velocity in said spatiotemporal flow velocity distribution is equal to or lower than a predetermined threshold or not and determining an interface position based on information on the operation; and a flow rate calculating step of calculating a flow rate by integrating a part of said spatiotemporal flow velocity distribution up to the interface position determined in said interface position determining step with respect to the cross-sectional area of said pipe.

10. A multiphase flow rate measuring method using an ultrasonic wave, embodied on a non-transitory computer-readable medium and executed on a processor comprising:

an ultrasonic wave transmitting/receiving step of a plurality of ultrasonic wave transmitting/receiving means disposed on a periphery of a pipe in which a multiphase flow containing a reflector flows transmitting an ultrasonic wave into said multiphase flow and receiving at least a reflected wave from said reflector and a reflected wave from an interface in said multiphase flow;

a flow velocity distribution calculating step of calculating a spatiotemporal flow velocity distribution for a plurality of positions in the direction of transmission of said ultrasonic wave that is substantially continuous in the temporal direction based on data on each reflected wave received by said ultrasonic wave transmitting/receiving means;

an interface position determining step of obtaining at least any of an acoustic intensity of each reflected wave from the data on each reflected wave received in said ultrasonic wave transmitting/receiving step and a pressure amplitude of each reflected wave from the data on each reflected wave received in said ultrasonic wave transmitting/receiving step and determining an interface position by using the fact that the reflected wave from the interface in said multiphase flow has a higher acoustic intensity than the reflected wave from said reflector or by using the fact that the reflected wave from the interface in said multiphase flow has a larger pressure amplitude than the reflected wave from said reflector; and a flow rate calculating step of calculating a flow rate by integrating a part of said spatiotemporal flow velocity distribution up to the interface position determined in said interface position determining step with respect to the cross-sectional area of said pipe.

11. A multiphase flow rate measuring method using an ultrasonic wave embodied on a non-transitory computer-readable medium and executed on a processor, comprising:

an ultrasonic wave transmitting/receiving step of a plurality of ultrasonic wave transmitting/receiving means disposed on a periphery of a pipe in which a multiphase flow containing a reflector flows transmitting an ultrasonic wave into said multiphase flow and receiving at least a reflected wave from said reflector and a reflected wave from an interface in said multiphase flow;

a flow velocity distribution calculating step of calculating a spatiotemporal flow velocity distribution for a plurality of positions in the direction of transmission of said ultrasonic wave that is substantially continuous in the temporal direction based on data on each reflected wave received by said ultrasonic wave transmitting/receiving means;

an interface position determining step of performing at least any of at least any of a spatial difference operation for a flow velocity distribution at a predetermined time in said spatiotemporal flow velocity distribution and a temporal difference operation for a flow velocity distribution at a predetermined position in said spatiotemporal flow velocity distribution and a binarization operation to determine whether each flow velocity in said spatiotemporal flow velocity distribution is equal to or lower than a predetermined threshold or not, obtaining at least any of an acoustic intensity of each reflected wave from the data on each reflected wave received in said ultrasonic wave transmitting/receiving step and a pressure amplitude of each reflected wave from the data on each reflected wave received in said ultrasonic wave transmitting/receiving step, and determining an interface position by using information on the operation and the fact that the reflected wave from the interface in said multiphase flow has a higher acoustic intensity than the reflected wave from said reflector or by using the information on the operation and the fact that the reflected wave from the interface in said multiphase flow has a larger pressure amplitude than the reflected wave from said reflector; and a flow rate calculating step of calculating a flow rate by integrating a part of said spatiotemporal flow velocity distribution up to the interface position determined in said interface position determining step with respect to the cross-sectional area of said pipe.

12. The multiphase flow rate measuring method using an ultrasonic wave according to any one of claims 9 to 11, further comprising:

a phase identifying step of obtaining a phase difference between an incident ultrasonic wave and a reflected ultrasonic wave at the interface position determined in said interface position determining step and identifying the type of a phase by determining whether said incident wave and said reflected wave are in anti-phase or not based on the phase difference.

* * * * *